(12) United States Patent
Wenzel et al.

(10) Patent No.: US 11,182,714 B2
(45) Date of Patent: Nov. 23, 2021

(54) BUILDING ENERGY OPTIMIZATION SYSTEM WITH CAPACITY MARKET PROGRAM (CMP) PLANNING

(71) Applicant: Johnson Controls Technology Company, Auburn Hills, MI (US)

(72) Inventors: Michael J. Wenzel, Oak Creek, WI (US); Mohammad N. Elbsat, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 151 days.

(21) Appl. No.: 16/294,475

(22) Filed: Mar. 6, 2019

(65) Prior Publication Data

US 2019/0303830 A1 Oct. 3, 2019

Related U.S. Application Data

(60) Provisional application No. 62/650,161, filed on Mar. 29, 2018.

(51) Int. Cl.
*G05D 3/12* (2006.01)
*G05D 5/00* (2006.01)
(Continued)

(52) U.S. Cl.
CPC ....... *G06Q 10/06315* (2013.01); *G05B 17/02* (2013.01); *G06Q 10/06314* (2013.01);
(Continued)

(58) Field of Classification Search
CPC ............ G06Q 10/06315; G06Q 50/06; G06Q 10/06314; G06Q 10/04; G06Q 10/067;
(Continued)

(56) References Cited

U.S. PATENT DOCUMENTS 7,580,775 B2 8/2009 Kulyk et al.
7,894,946 B2 2/2011 Kulyk et al.
(Continued)

OTHER PUBLICATIONS

Pacific Gas and Electric Company, "Electric Schedule E-CBP Capacity Bidding Program," San Francisco, CA, Feb. 20, 2018. 12 pages.
(Continued)

*Primary Examiner* — Zhipeng Wang
(74) *Attorney, Agent, or Firm* — Foley & Lardner LLP

(57) ABSTRACT

A method for generating an optimal nominated capacity value for participation in a capacity market program (CMP) includes generating, by a processing circuit, an objective function comprising a nominated capacity term, wherein the nominated capacity term indicates a nominated capacity value, wherein the nominated capacity value is a curtailment value that a facility is on standby to reduce its load by in response to receiving a dispatch from a utility. The method includes optimizing, by the processing circuit, the objective function to determine the optimal nominated capacity value for a program operating period and transmitting, by the processing circuit, the optimal nominated capacity value to one or more systems associated with the CMP to participate in the CMP.

20 Claims, 15 Drawing Sheets

(51) Int. Cl.

| | | |
|---|---|---|
| *G05D 9/00* | (2006.01) | |
| *G05D 11/00* | (2006.01) | |
| *G05D 17/00* | (2006.01) | |
| *G06Q 10/06* | (2012.01) | |
| *H02J 3/14* | (2006.01) | |
| *H04L 12/24* | (2006.01) | |
| *G05B 17/02* | (2006.01) | |
| *H02J 3/32* | (2006.01) | |
| *G06Q 50/06* | (2012.01) | |
| *H02J 3/38* | (2006.01) | |
| *H02J 3/00* | (2006.01) | |

(52) U.S. Cl.
CPC ............ *H02J 3/14* (2013.01); *H04L 41/5012* (2013.01); *G06Q 50/06* (2013.01); *H02J 3/003* (2020.01); *H02J 3/32* (2013.01); *H02J 3/383* (2013.01); *H02J 2203/20* (2020.01)

(58) Field of Classification Search
CPC ..... G05B 17/02; H02J 3/14; H02J 3/32; H02J 3/383; H02J 2003/003; H02J 2003/007; H02J 2203/20; H02J 2300/26; H02J 2310/12; H02J 3/003; H02J 3/381; H02J 3/385; H04L 41/5012; Y02B 70/3225; Y02E 10/56; Y02E 70/30; Y04S 20/222; Y04S 40/20

See application file for complete search history.

(56) References Cited

U.S. PATENT DOCUMENTS

| | | | |
|---|---|---|---|
| 8,457,802 B1 | 6/2013 | Steven et al. | |
| 8,527,108 B2 | 9/2013 | Kulyk et al. | |
| 8,527,109 B2 | 9/2013 | Kulyk et al. | |
| 8,918,223 B2 | 12/2014 | Kulyk et al. | |
| 9,110,647 B2 | 8/2015 | Kulyk et al. | |
| 9,429,923 B2 | 8/2016 | Ward et al. | |
| 9,703,339 B2 | 7/2017 | Kulyk et al. | |
| 10,139,877 B2 | 11/2018 | Kulyk et al. | |
| 10,175,681 B2 | 1/2019 | Wenzel et al. | |
| 10,186,889 B2 | 1/2019 | Wenzel et al. | |
| 10,190,793 B2 | 1/2019 | Drees et al. | |
| 10,197,632 B2 | 2/2019 | Wenzel et al. | |
| 10,222,083 B2 | 3/2019 | Drees et al. | |
| 10,222,427 B2 | 3/2019 | Wenzel et al. | |
| 10,770,897 B1 * | 9/2020 | Hertz-Shargel | F24F 11/30 |
| 2010/0179704 A1 | 7/2010 | Ozog | |
| 2013/0178991 A1 | 7/2013 | Gheerardyn et al. | |
| 2014/0277769 A1 * | 9/2014 | Matsuoka | G05D 23/1905 |
| | | | 700/278 |
| 2014/0277795 A1 * | 9/2014 | Matsuoka | G06F 16/955 |
| | | | 700/291 |
| 2014/0303797 A1 * | 10/2014 | Kitajima | G05B 15/02 |
| | | | 700/291 |
| 2015/0057820 A1 | 2/2015 | Kefayati et al. | |
| 2015/0316907 A1 | 11/2015 | Elbsat et al. | |
| 2016/0329708 A1 * | 11/2016 | Day | G06Q 30/08 |
| 2017/0102675 A1 | 4/2017 | Drees | |
| 2017/0103483 A1 * | 4/2017 | Drees | G05B 13/021 |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104449 A1 | 4/2017 | Drees | |
| 2017/0207629 A1 | 7/2017 | Seki et al. | |
| 2018/0172309 A1 * | 6/2018 | Niikura | F24F 11/65 |
| 2018/0196456 A1 | 7/2018 | Elbsat | |
| 2018/0197253 A1 | 7/2018 | Elbsat et al. | |
| 2018/0314220 A1 | 11/2018 | Kumar et al. | |
| 2019/0302716 A1 * | 10/2019 | Wenzel | H02J 3/385 |

OTHER PUBLICATIONS

Extended European Search Report on EP 19165142.1 dated May 23, 2019. 8 pages.
Ziaolin et al. "Aggregators' Optimal Bidding Strategy in Sequential Day-Ahead and Intraday Electricity Spot Markets", ENERGIES. vol. 10, No. 4, Apr. 1, 2017. 20 pages.
Ayon et al., "Aggregators' Optimal Bidding Strategy in Sequential Day-Ahead And Intraday Electricity Spot Markets," energies, Apr. 1, 2017, 20 pages.
Extended European Search Reporton EP 19165208.0, dated May 28, 2019, 9 pages.
Office Action on EP 19165142.1, dated Aug. 12, 2020, 6 pages.
Office Action on EP 19165208.0, dated Aug. 12, 2020, 4 pages.
Summons to Attend Oral Proceedings on EP 19165208.0, dated May 20, 2021, 10 pages.

* cited by examiner

BUILDING ENERGY OPTIMIZATION SYSTEM WITH CAPACITY MARKET PROGRAM (CMP) PLANNING

CROSS-REFERENCE TO RELATED PATENT APPLICATION

This application claims the benefit of and priority to U.S. Provisional Patent Application No. 62/650,161 filed Mar. 29, 2018, the entirety of which is incorporated by reference herein.

BACKGROUND

The present disclosure generally relates to building systems of a building. More particularly, the present disclosure relates to building systems that control energy usage of a building.

A utility company can offer various incentive programs for a building owner to participate in. These programs include frequency regulation, economic load demand response (ELDR), and other various types of programs which reward a building owner for various load reduction or electric grid management actions. One example of such an incentive program is the capacity market program (CMP). In this program, the utility company can provide monetary awards to the building owner for providing insurance that the owner will be able to reduce a load of the building when the utility company requires a load reduction. In this regard, the utility can call upon the owner at a particular time to request that the owner cause their building to reduce its energy usage according to the CMP.

SUMMARY

One implementation of the present disclosure is a method for generating an optimal nominated capacity value for participation in a capacity market program (CMP). The method includes generating, by a processing circuit, an objective function including a nominated capacity term, wherein the nominated capacity term indicates the optimal nominated capacity value, wherein the optimal nominated capacity value is a curtailment value that a facility is on standby to reduce its load by in response to receiving a dispatch from a utility. The method includes optimizing, by the processing circuit, the objective function to determine the optimal nominated capacity value for a program operating period and transmitting, by the processing circuit, the optimal nominated capacity value to one or more systems associated with the CMP to participate in the CMP.

In some embodiments, transmitting, by the processing circuit, the optimal nominated capacity value to the one or more systems associated with the CMP to participate in the CMP includes at least one of transmitting, by the processing circuit, the optimal nominated capacity value to one or more building systems configured to control one or more pieces of building equipment of the facility based on the optimal nominated capacity value or transmitting, by the processing circuit, the optimal nominated capacity value to one or more utility systems of the utility configured to supervise the CMP.

In some embodiments, the optimal nominated capacity value is a decision variable of the objective function, wherein the optimal nominated capacity value is multiplied by a weighting term, wherein the weighting term accounts for an optimization horizon being less than the program operating period.

In some embodiments, the method includes generating, by the processing circuit, scenarios, wherein each scenario is for at least one of one or more particular load amounts, one or more particular rate amounts, or one or more particular dispatch hours. In some embodiments, generating, by the processing circuit, the objective function includes generating, by the processing circuit, cost functions, one cost function of the cost functions for each of the scenarios, wherein the objective function includes a sum of the cost functions and a variable for the optimal nominated capacity value. In some embodiments, optimizing, by the processing circuit, the objective function includes optimizing, by the processing circuit, the objective function with one or more constraints, wherein the one or more constraints cause the curtailment value to be at least the optimal nominated capacity value for each scenario of the scenarios that is associated with one of the one or more particular dispatch hours. In some embodiments, optimizing, by the processing circuit, the objective function further includes optimizing the objective function with one or more additional constraints, wherein the one or more additional constraints cause a state of charge of a storage device of the facility to be the same at the beginning and end of each of the scenarios.

In some embodiments, the sum of the cost functions is a weighted sum weighted based on a first probability of receiving the dispatch during each of the scenarios, wherein the objective function is based on a second probability of each of the scenarios being an actual scenario that occurs.

In some embodiments, the objective function includes an energy term that accounts for revenue generated by reducing the load of the facility by the optimal nominated capacity value or by a value greater than the optimal nominated capacity value, wherein the energy term is implemented as an electric rate adjustment to an energy rate in the objective function, wherein the value of the electric rate adjustment is a sum of an energy rates of dispatched hours.

In some embodiments, the energy rate is adjusted based on a compensation rate for reducing the load of the facility by the value greater than the optimal nominated capacity value.

In some embodiments, optimizing the objective function to determine the optimal nominated capacity value includes optimizing the objective function with one or more constraints.

In some embodiments, the one or more constraints cause the optimal nominated capacity value to be a value that the facility is capable of reducing the load of the facility by.

In some embodiments, the nominated capacity term of the objective function and the one or more constraints are based on a raw baseline, wherein the raw baseline indicates a typical value for the load of the facility.

In some embodiments, the method includes estimating, by the processing circuit, the raw baseline based on historic values, wherein the historic values are values of the load of the facility for non-participation times of a previous time period, wherein the non-participation times are times where the processing circuit did not receive the dispatch from the utility.

In some embodiments, the method includes adjusting, by the processing circuit, raw baseline values of the raw baseline to account for a growth in the load of the facility over time.

Another implementation of the present disclosure is a system for generating an optimal nominated capacity value for participation in a capacity market program (CMP). The system includes one or more memory devices configured to store instructions thereon, that, when executed by one or more processors, cause the one or more processors to generate an objective function including a nominated capacity term, wherein the nominated capacity term indicates the optimal nominated capacity value, wherein the optimal nominated capacity value is a curtailment value that a facility is on standby to reduce its load by in response to receiving a dispatch from a utility, optimize the objective function to determine the optimal nominated capacity value for a program operating period, and transmit the optimal nominated capacity value to one or more systems associated with the CMP to participate in the CMP.

In some embodiments, the instructions cause the one or more processors to transmit the optimal nominated capacity value to the one or more systems associated with the CMP to participate in the CMP by performing at least one of transmitting the optimal nominated capacity value to one or more building systems configured to control one or more pieces of building equipment of the facility based on the optimal nominated capacity value or transmitting the optimal nominated capacity value to one or more utility systems of the utility configured to supervise the CMP.

In some embodiments, the optimal nominated capacity value is a decision variable of the objective function, wherein the optimal nominated capacity value is multiplied by a weighting term, wherein the weighting term accounts for an optimization horizon being less than the program operating period.

In some embodiments, the instructions cause the one or more processors to generate scenarios, wherein each scenario is for at least one of one or more particular load amounts, one or more particular rate amounts, or one or more particular dispatch hours. In some embodiments, the instructions cause the one or more processors to generate the objective function by generating cost functions, one cost function of the cost functions for each of the scenarios, wherein the objective function includes a sum of the cost functions and a variable for the optimal nominated capacity value. In some embodiments, the instructions cause the one or more processors to optimize the objective function by optimizing the objective function with one or more constraints, wherein the one or more constraints cause the curtailment value to be at least the optimal nominated capacity value for each scenario of the scenarios that is associated with one of the one or more particular dispatch hours. In some embodiments, the instructions cause the one or more processors to optimize the objective function by optimizing the objective function with one or more additional constraints, wherein the one or more additional constraints cause a state of charge of a storage device of the facility to be the same at the beginning and end of each of the scenarios.

In some embodiments, the sum of the cost functions is a weighted sum weighted based on a first probability of receiving the dispatch during each of the scenarios, wherein the objective function is based on a second probability of each of the scenarios being an actual scenario that occurs.

Another implementation of the present disclosure is a building system for generating an optimal nominated capacity value for participation in a capacity market program (CMP). The building system includes one or more building control systems configured to operate, based on the optimal nominated capacity value, one or more pieces of building equipment to control one or more environmental conditions of a facility. The building system includes one or more processing circuits configured to generating, by a processing circuit, an objective function including a nominated capacity term, wherein the nominated capacity term indicates the optimal nominated capacity value, wherein the optimal nominated capacity value is a curtailment value that the facility is on standby to reduce its load by in response to receiving a dispatch from a utility. The one or more processing circuits are configured to optimizing, by the processing circuit, the objective function to determine the optimal nominated capacity value for a program operating period and transmitting, by the processing circuit, the optimal nominated capacity value to the one or more building control systems to participate in the CMP.

In some embodiments, the one or more processing circuits are configured to transmit the optimal nominated capacity value to one or more utility systems of the utility configured to supervise the CMP.

In some embodiments, the optimal nominated capacity value is a decision variable of the objective function, wherein the optimal nominated capacity value is multiplied by a weighting term, wherein the weighting term accounts for an optimization horizon being less than the program operating period.

Another implementation of the present disclosure is an energy optimization system for participating in a capacity market program (CMP) based on a nominated capacity value. The system includes one or more memory devices storing instructions, that, when executed on one or more processors, cause the one or more processors to receive the nominated capacity value, wherein the nominated capacity value is a curtailment value that a facility is on standby to reduce its load by in response to receiving a dispatch from a utility, generate an objective function and one or more CMP constraints, wherein the one or more CMP constraints cause an optimization of the objective function with the one or more CMP constraints to generate a resource allocation that reduces the load of the facility by the nominated capacity value in response to receiving the dispatch from the utility, receive the dispatch from the utility, optimize the objective function based on the nominated capacity value, the dispatch, and the one or more CMP constraints to determine the resource allocation, and control one or more pieces of building equipment based on the resource allocation.

In some embodiments, the instructions cause the one or more processors to determine that the one or more processors have not received the dispatch for a particular time and optimize the objective function for the particular time not based on the one or more CMP constraints in response to a determination that the one or more processors have not received the dispatch for the particular time.

In some embodiments, the one or more CMP constraints are based upon a probability that the energy optimization system will receive the dispatch from the utility for a particular time.

In some embodiments, the one or more CMP constraints are one or more soft constraints, wherein the instructions cause the one or more processors to optimize the objective function based on the one or more soft constraints by violating the one or more soft constraints if it is impossible to reduce the load of the facility by the nominated capacity value, wherein the one or more soft constraints indicate a penalty for violating the one or more soft constraints.

In some embodiments, the penalty is a participation compensation rate that is based on a probability of being dispatched by the utility.

In some embodiments, the one or more CMP constraints cause the one or more processors to optimize the objective function to generate a resource allocation that causes the load of the facility to be reduced by a value greater than the nominated capacity value, wherein a constraint value of each of the one or more CMP constraints is based on a probability that the energy optimization system will receive the dispatch from the utility for a particular time.

In some embodiments, the objective function includes one or more energy terms, wherein the one or more energy terms account for revenue lost in response to not reducing the load of the facility by the nominated capacity value in response to receiving the dispatch from the utility or revenue gained in response to reducing the load of the facility by the nominated capacity value or by a value greater than the nominated capacity value in response to receiving the dispatch from the utility.

In some embodiments, the one or more energy terms are implemented in the objective function as adjustments to an energy rate of the objective function, wherein the energy rate is a first level during a dispatch hour and a second level, less than the first level, during a baseline hour, wherein the baseline hour is one of a first three hours of a four hour period occurring immediately before a first dispatch hour of a day.

Another implementation of the present disclosure is a method for participating in a capacity market program (CMP) based on a nominated capacity value. The method includes receiving, by a processing circuit, the nominated capacity value, wherein the nominated capacity value is a curtailment value that a facility is on standby to reduce its load by in response to receiving a dispatch from a utility, generating, by the processing circuit, an objective function and one or more CMP constraints, wherein the one or more CMP constraints cause an optimization of the objective function with the one or more CMP constraints to generate a resource allocation that reduces the load of the facility by the nominated capacity value in response to receiving the dispatch from the utility, receiving, by the processing circuit, the dispatch from the utility, optimizing, by the processing circuit, the objective function based on the nominated capacity value, the dispatch, and the one or more CMP constraints to determine the resource allocation, and controlling, by the processing circuit, one or more pieces of building equipment based on the resource allocation.

In some embodiments, the one or more CMP constraints cause optimizing, by the processing circuit, the objective function to generate a resource allocation that causes the load of the facility to be reduced by a value greater than the nominated capacity value, wherein a constraint value of each of the one or more CMP constraints is based on a probability that the processing circuit will receive the dispatch from the utility for a particular time.

In some embodiments, the method includes determining, by the processing circuit, that the processing circuit has not received the dispatch for a particular time and optimizing, by the processing circuit, the objective function for the particular time not based on the one or more CMP constraints in response to a determination that the processing circuit has not received the dispatch for the particular time.

In some embodiments, the one or more CMP constraints are based upon a probability that the processing circuit will receive the dispatch from the utility for a particular time.

In some embodiments, the one or more CMP constraints are one or more soft constraints, wherein the processing circuit is configured to optimize the objective function based on the one or more soft constraints by violating the one or more soft constraints if it is impossible to reduce the load of the facility by the nominated capacity value, wherein the one or more soft constraints indicate a penalty for violating the one or more soft constraints.

In some embodiments, the penalty is a participation compensation rate that is based on a probability of being dispatched by the utility.

In some embodiments, the objective function includes one or more energy terms, wherein the one or more energy terms account for revenue lost in response to not reducing the load of the facility by the nominated capacity value in response to receiving the dispatch from the utility or revenue gained in response to reducing the load of the facility by the nominated capacity value or by a value greater than the nominated capacity value in response to receiving the dispatch from the utility.

In some embodiments, the one or more energy terms are implemented in the objective function as adjustments to an energy rate of the objective function, wherein the energy rate is a first level during a dispatch hour and a second level, less than the first level, during a baseline hour, wherein the baseline hour is one of a first three hours of a four hour period occurring immediately before a first dispatch hour of a day.

Another implementation of the present disclosure is a building control system for participating in a capacity market program (CMP) based on a nominated capacity value. The building control system includes one or more pieces of building equipment configured to control an environmental condition of a building and a controller configured to receive the nominated capacity value, wherein the nominated capacity value is a curtailment value that a facility is on standby to reduce its load by in response to receiving a dispatch from a utility, generate an objective function and one or more CMP constraints, wherein the one or more CMP constraints cause an optimization of the objective function with the one or more CMP constraints to generate a resource allocation that reduces the load of the facility by the nominated capacity value in response to receiving the dispatch from the utility, receive the dispatch from the utility, optimize the objective function based on the nominated capacity value, the dispatch, and the one or more CMP constraints to determine the resource allocation, and control the one or more pieces of building equipment based on the resource allocation.

In some embodiments, the controller is configured to optimize the objective function to generate a resource allocation that causes the load of the facility to be reduced by a value greater than the nominated capacity value based on the one or more CMP constraints, wherein a constraint value of each of the one or more CMP constraints is based on a probability that controller will receive the dispatch from the utility for a particular time.

In some embodiments, the one or more CMP constraints are one or more soft constraints, wherein the controller is configured to optimize the objective function based on the one or more soft constraints by violating the one or more soft constraints if it is impossible to reduce the load of the facility by the nominated capacity value, wherein the one or more soft constraints indicate a penalty for violating the one or more soft constraints.

In some embodiments, the objective function includes one or more energy terms, wherein the one or more energy terms account for revenue lost in response to not reducing the load of the facility by the nominated capacity value in response to receiving the dispatch from the utility or revenue gained in response to reducing the load of the facility by the nominated capacity value or by a value greater than the nominated capacity value in response to receiving the dispatch from the utility.

In some embodiments, the controller is configured to generate scenarios, wherein each scenario is for at least one of one or more possible load amounts, one or more possible rate amounts, or one or more possible dispatch hours. In some embodiments, the controller is configured to generate the objective function by generating cost functions, one cost function of the plurality of cost functions for each of the plurality of scenarios, wherein the objective function includes a sum of the cost functions and a variable for the resource allocation. In some embodiments, the one or more constraints cause the resource allocation to be at least the optimal nominated capacity value for each scenario of the plurality of scenarios where the dispatch is received from the utility.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
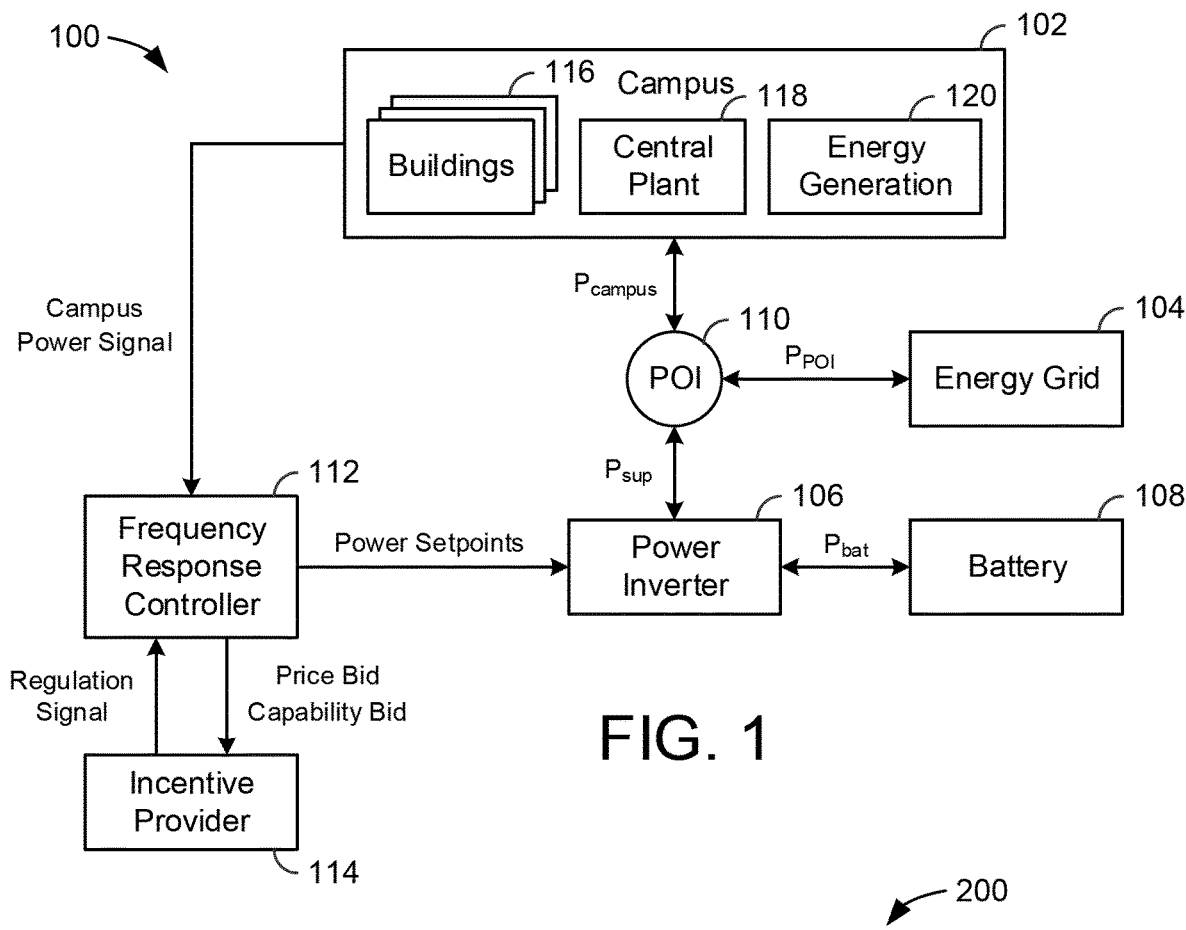
FIG. 1 is a block diagram of a frequency response optimization system, according to an exemplary embodiment.

Referring generally to the FIGURES, systems and methods are shown and described for participation in a CMP, according to various exemplary embodiments. The systems can include a planner and a model predictive controller (MPC). The planner and MPC can be implemented on the same processing system (e.g., on one or more processors and/or memory devices) and/or on separate individual systems configured to communicate with each other (processing systems are described in greater detail with reference to FIGS. 6A-7). The planner can be configured to determine parameters for participation in the CMP, e.g., a nominated capacity value. The nominated capacity value can be a value indicating an amount that a facility is on standby to reduce its load by during a program period of the CMP. The planner can generate the nominated capacity value by performing an optimization (e.g., a stochastic optimization) with one or more objective functions and one or more optimization constraints. In response to generating the nominated capacity value, the planner can submit the nominated capacity value to a CMP program manager, e.g., a system of a utility, regional transmission organization (RTO), and/or independent system operator (ISO) as a bid for participation in the CMP. Furthermore, the planner is configured to communicate the nominated capacity value to the MPC for participation in the CMP, in some embodiments.

The CMP can be configured to cause a facility to participate in the CMP after the planner has submitted a bid with the nominated capacity value to the utility. The CMP can, in some embodiments, be configured to receive the nominated capacity value from the planner. Furthermore, the CMP can be configured to receive a dispatch from the utility. The dispatch may be a request by the utility to reduce the load of the facility by at least the nominated capacity value provided to the utility in the bid by the planner. The CMP can be configured to perform one or more optimizations to determine a value to reduce the load of the facility while taking into account various rewards and/or penalties for complying with the request by the utility or failing to comply with the request by the utility.

Planner for Nominated Capacity Optimization

The systems and methods discussed herein relate to a Long Term Planning Controller, the planner as previously described, that is configured to determine a nominated capacity bid prior to the beginning of a participation time, e.g., before the beginning of a month. The planner can be configured to provide the nominated capacity to the MPC for use in participating in the CMP.

The systems and a methods discussed herein relate to controlling a facility that is in a region within which a capacity program exists. The facility may be entered into this type of program at the beginning of a month and is paid for insurance by the facility that if dispatched during the month, the facility will reduce its electrical load by the nominated capacity. In this system, just before the beginning of each month, a longer term optimization problem can be run by the planner. The cost function and constraints can be generated based on the configuration of the facility. In addition to the decision variables based on the configuration, another decision variable can be added to the cost function by the planner. This decision variable can represent the amount of the nominated capacity bid. In some embodiments, the cost per kW of this decision variable should be equal to the payment the utility will make for this insurance; i.e., the capacity rate. The capacity rate may be a payment per kW the utility pays for the promise by the facility promise to reduce loads by the nominated capacity when called.

The planner can be configured to add a set of constraints to the optimization problem that guarantee nominated capacity can be curtailed during any predicted or input dispatch hours while still meeting all facility loads in a cost efficient manner. The optimization problem can be solved by the planner to obtain the nominated capacity bid. The optimization can be set up in such a way that the cost function is reduced by a rate times the amount of constraint that is added to the problem.

In some embodiments, the nominated capacity bid is sent to the utility for consideration in the CMP. In some embodiments the nominated capacity bid is sent to a second controller, the MPC, for implementation of the prescribed curtailment during dispatch hours.

In some embodiments other operational aspects of the plan are calculated in the optimization problem. These can include load allocations for all the equipment in the system.

In some embodiments, the cost per kW of this variable is multiplied by a weighting term. The weighting term can be used to account for the possibility that an individual optimization may not include the entire month and thus the payment is prorated for the time period included in the optimization.

In some embodiments, a raw baseline is input to the system prior to the run of the long term optimization problem. This raw baseline could be estimated from the operation during weekdays that did not have any dispatched hours in the previous month or during the same month of the previous year(s). The raw baseline can be used to define the constraints that are added to the optimization problem.

In some embodiments, where the raw baseline is input to the system and data from the same month of the previous year(s) is used to estimate the raw baseline, the data from previous year(s) may be modified to account for growth in the electrical demand year over year.

In some embodiments, an energy term may be added to the cost function to account for additional revenue generated during over performance. These energy terms can be implemented as an adjustment to the rates in the cost function. The amount of the adjustment is equal to the sum of one or more sets of energy rates during the (input) dispatched hours. In some embodiments, the adjusted rates include both the capacity rate and the energy rates.

In some embodiments, several scenarios for the loads, rates, and/or dispatched hours are input. Each scenario can represent a portion of the month. The cost function can be a weighted sum of each scenario's cost plus a single variable for the nominated capacity times its (potentially weighted) rate. The constraints can be added to scenarios for which there are dispatch hours to guarantee that the curtailment is greater than the nominated capacity (there is only one nominated capacity for all rates). Additional constraints can be added to the long term planning problem by the planner to guarantee that the states of the system at the end of each scenario are equal to those at the beginning of the beginning of each scenario. Examples of a stochastic optimization framework can be found in U.S. Provisional Patent Application No. 62/491,108 filed Apr. 27, 2017, the entirety of which is incorporated by reference herein.

Model Predictive Controller (MPC) for Capacity Market Program (CMP) Participation Systems and methods discussed herein relate to the MPC (can be a standalone component) that receives a determined nominated capacity that is also sent to a utility facilitating the CMP. The nominated capacity may be an amount of kW curtailment agreed upon between the utility and a facility controlled by the MPC. The nominated capacity may be referred to as a nominated capacity bid when it has been offered to the utility, but not yet agreed upon.

The MPC can be configured to control a facility that is participating in a demand response capacity market program. The facility can be entered into a CMP program at the beginning of a month. The facility is paid for insurance by the facility that, if dispatched, the facility can reduce its electrical load by an agreed upon capacity called the nominated capacity. Dispatch hours may be hours where the utilities call on the promise of the facility to reduce its load by the nominated capacity. In this system, a cost function and constraints can be generated based on the configuration of the facility. Constraints for participating in the CMP can be added to those that already exist in response to being dispatched to reduce the facility load. The MPC can be configured to solve the optimization problem and recommend a cost efficient load allocation across all equipment of the facility while reducing the demand by the nominated capacity during dispatched hours.

In some embodiments, the load allocation may be automatically dispatched to a building automation system for execution by the MPC. In some embodiments, the building automation system then maintains control at the specified load allocations.

In some embodiments, the MPC can be configured to add energy terms to the cost function. In some embodiments, the energy terms are used to describe penalties for underperforming by reducing by a load less than the nominated capacity. In some embodiments, the energy terms are used to describe revenue for over performing by reducing the demand more than the nominated capacity In some embodiments, where energy terms are added to the cost function, the energy terms may be implemented by adjusting the original energy rate to a new effective rate. This effective rate can be increased during the dispatch hours and decreased during baseline hours. The baseline hours may be the first three hours of a four hour period immediately before the first dispatch hour of the day. This time frame can be used to calculate the load point adjustment.

In some embodiments, the MPC can be configured to add constraints to the system based on a prediction that facility curtailment might be dispatched during a set of hours. This can improve the chance that the curtailment is feasible during the actual dispatched hours.

In some embodiments, the constraint may be "soft" such that MPC can be configured to run the optimization problem properly even if it is impossible for it to curtail by the nominated capacity. In this case, the MPC can be configured to control the equipment in such a way as to minimize the amount of underperformance. A soft constraint may be a constraint that can be violated. However, the violation amount has a penalty associated with it in the cost function.

In some embodiments, the MPC can be configured to add constraints to guarantee reduction of the demand by an amount smaller than the nominated capacity. The MPC can be configured to determine the amount of the constraint by the probability of being dispatched. In this case, if there is a low probability of being dispatched the amount of underperformance allowed by the constraints could be high. If there is a high probability of being dispatched the amount of underperformance allowed by the constraint could be low.

In some embodiments, where the constraint is a soft constraint, the penalty for violating the soft constraint is based on the probability of the facility being dispatched during an hour of the constraint. In this case, the penalty may be the rate at which the facility is paid for their guarantee multiplied by a probability of being dispatched.

In some embodiments, the constraints are always part of the optimization problem, but are activated in response to being dispatched.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a RTO, an ISO, or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
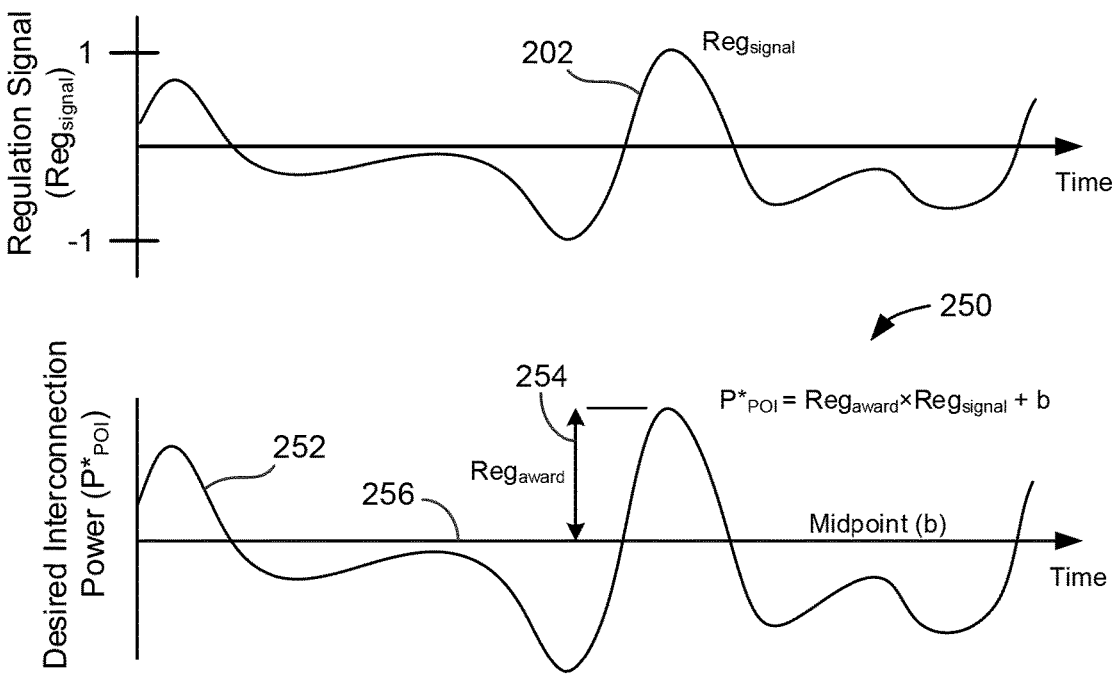
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from $-1$ to $1$ (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}=0.5$) may indicate that system 100 is requested to add 5 MW of power at POI 110 relative to midpoint b (e.g., $P^*_{POI}=10MW \times 0.5+b$), whereas a regulation signal value of $-0.3$ may indicate that system 100 is requested to remove 3 MW of power from POI 110 relative to midpoint b (e.g., $P^*_{POI}=10MW \times -0.3+b$).

Graph 250 illustrates the desired interconnection power $P^*_{POI}$ 252 as a function of time. $P^*_{POI}$ 252 may be calculated by frequency response controller 112 based on $Reg_{signal}$ 202, $Reg_{award}$ 254, and a midpoint b 256. For example, controller 112 may calculate $P^*_{POI}$ 252 using the following equation:

$$P^*_{POI}=Reg_{award} \times Reg_{signal}+b$$

where $P^*_{POI}$ represents the desired power at POI 110 (e.g., $P^*_{POI}=P_{sup}+P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P^*_{POI}=Reg_{award} \times Reg_{signal}+b$$

where $P^*_{POI}=P_{sup}+P_{campus}$. Positive values of $P^*_{POI}$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P^*_{POI}=Reg_{award} \times Res_{FR}+b$$

where $Res_{FR}$ is an optimal frequency response generated by optimizing a value function. Controller 112 may subtract $P_{campus}$ from $P^*_{POI}$ to generate the power setpoint for power inverter 106 (i.e., $P_{sup}=P^*_{POI}-P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
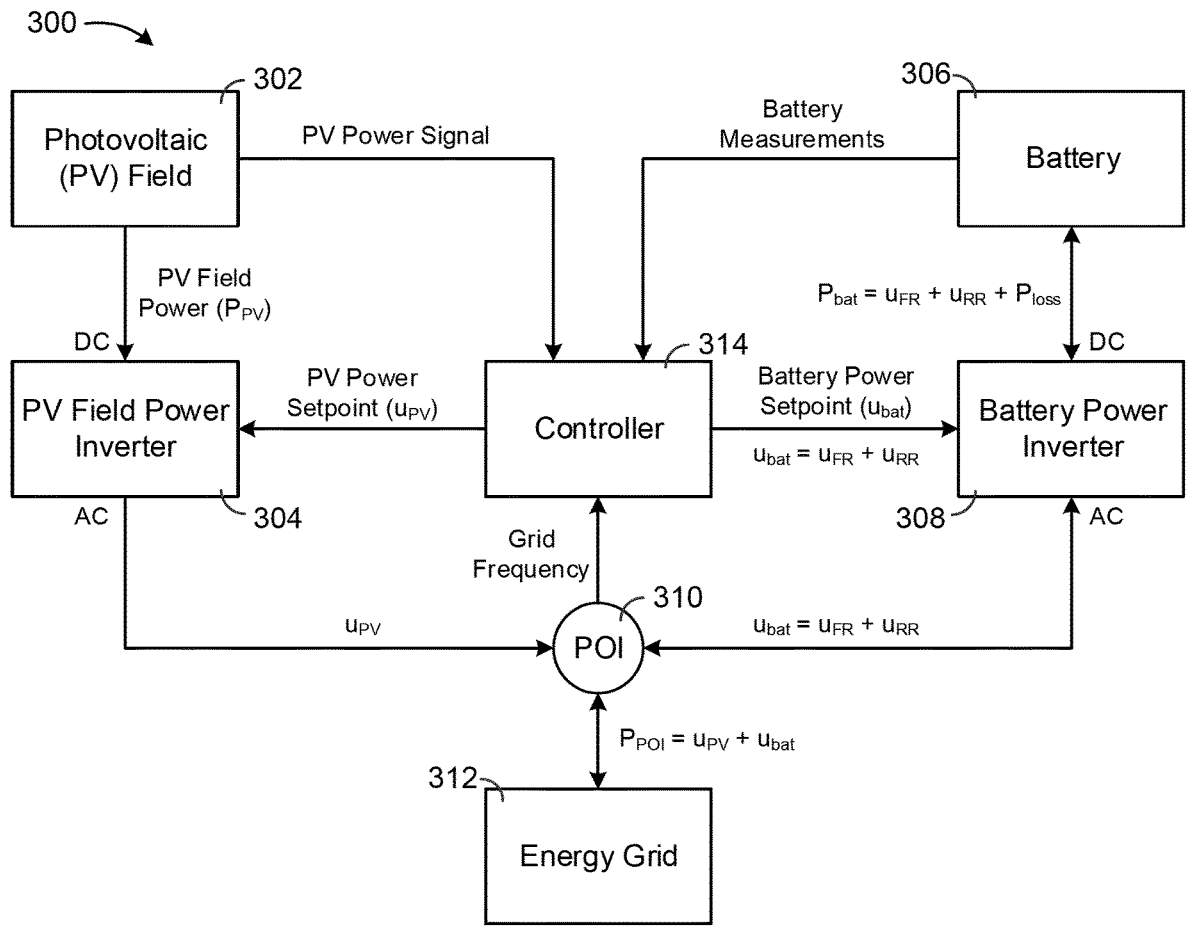
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
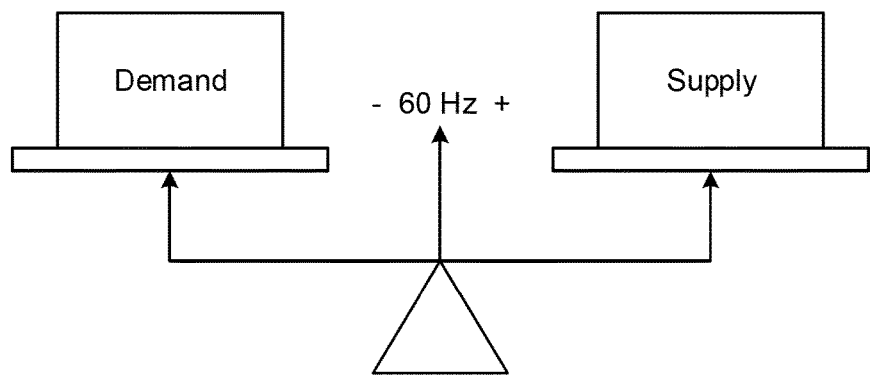
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include multiple linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat} = u_{FR} + u_{RR}$). The DC battery power $P_{bat}$ is shown to include both $u_{FR}$ and $u_{RR}$ as well as an additional term $P_{POI}$ representing power losses in battery 306 and/or battery power inverter 308 (i.e., $P_{bat} = u_{FR} + u_{RR} + P_{loss}$). The PV field power $u_{PV}$ and the battery power $u_{bat}$ combine at POI 110 to form $P_{POI}$ (i.e., $P_{POI} = u_{PV} + u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5A:
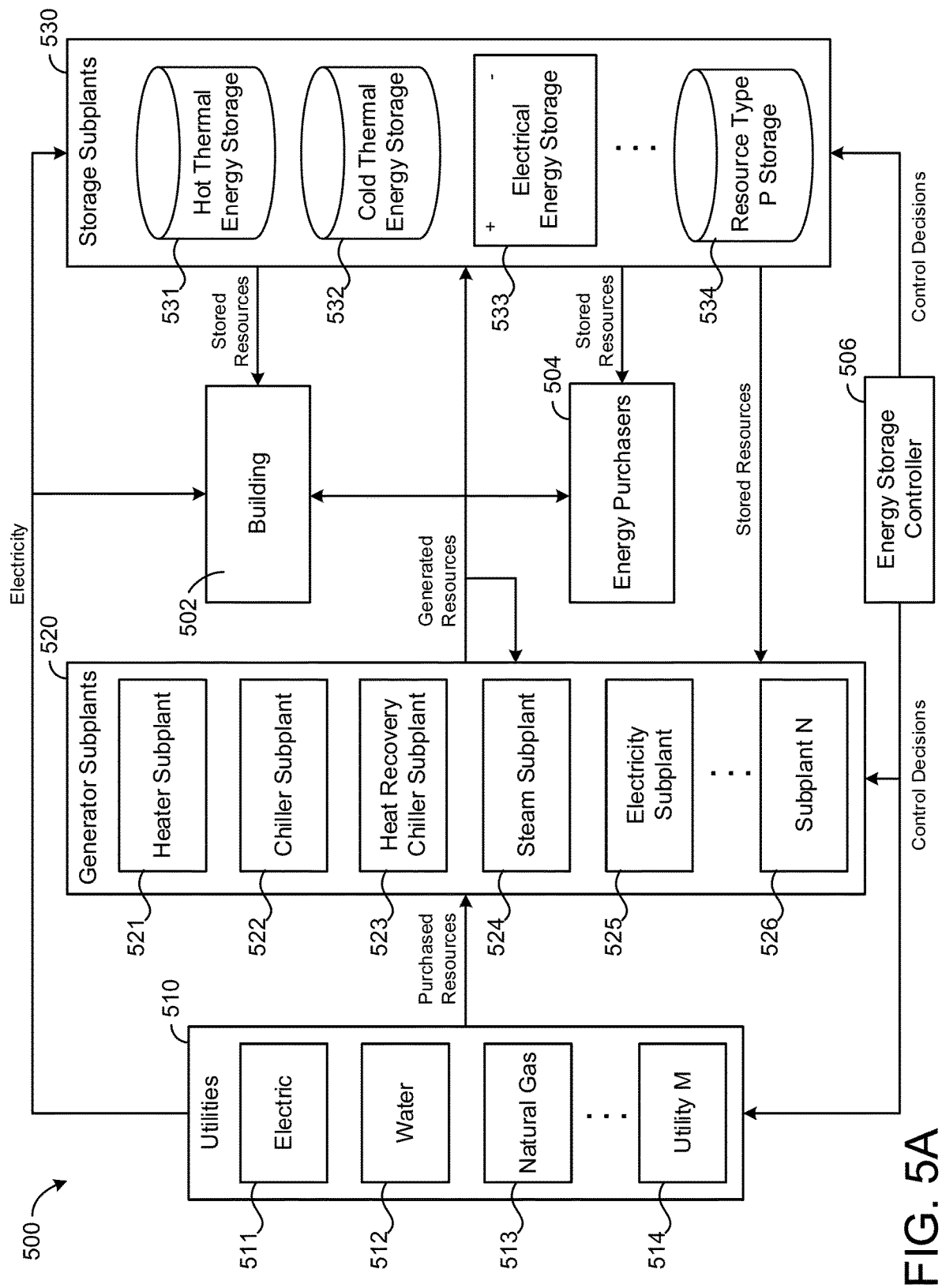
FIG. 5A is a block diagram of an energy storage system including thermal energy storage and electrical energy storage, according to an exemplary embodiment.

Referring now to FIG. 5A, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include multiple utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include multiple generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5A, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Cost Optimization System

Figure 5B:
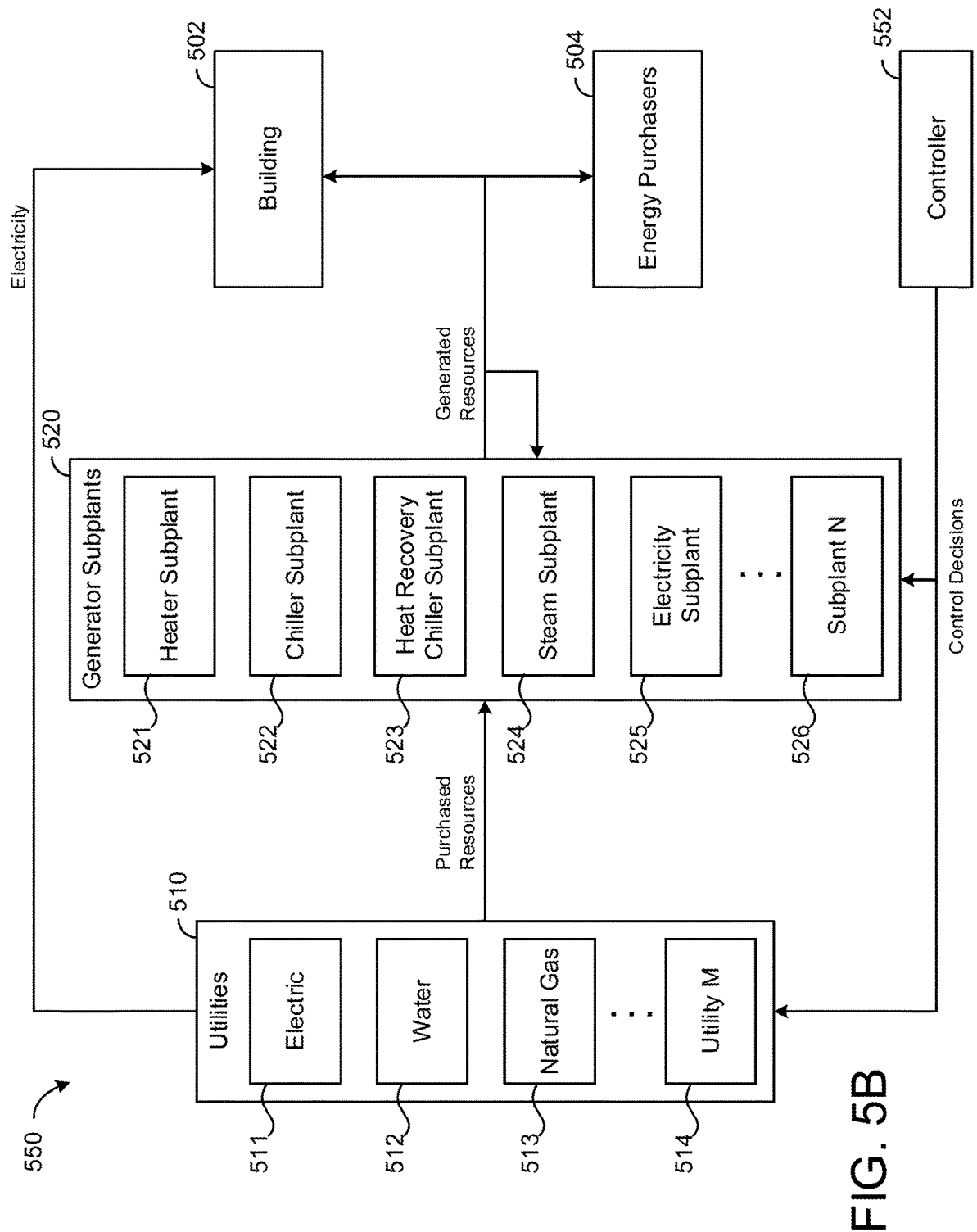
FIG. 5B is a block diagram of an energy cost optimization system without thermal or electrical energy storage, according to an exemplary embodiment.

Referring now to FIG. 5B, a block diagram of an energy cost optimization system 550 is shown, according to an exemplary embodiment. Energy cost optimization system 550 is shown to include many of the same components as energy storage system 500 (described with reference to FIG. 5A) with the exception of storage subplants 530. System 550 is an example of a system without thermal or electrical energy storage in which the peak load contribution cost optimization techniques can be implemented.

Energy cost optimization system 550 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy cost optimization system 550. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy cost optimization system 550 operates to satisfy the resource demand associated with building 502.

Energy cost optimization system 550 is shown to include multiple utilities 510. Utilities 510 may provide system 550 with resources such as electricity, water, natural gas, or any other resource that can be used by system 550 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.) or provided directly to building 502. For example, utilities 510 are shown providing electricity directly to building 502.

Energy cost optimization system 550 is shown to include multiple generator subplants 520. Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510 and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be provided to building 502, sold to energy purchasers 504, and/or used by other generator subplants 520. For example, the electricity generated by electricity subplant 525 may be used by chiller subplant 522 to generate cold thermal energy, provided to building 502, and/or sold to energy purchasers 504.

Still referring to FIG. 5B, energy cost optimization system 550 is shown to include a controller 506. Controller 506 may be configured to control the distribution, production, and usage of resources in system 550. In some embodiments, controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy cost optimization system 550 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating system 550. In some embodiments, the cost of operating system 550 includes a cost of excessive equipment start/stops during the optimization period.

Each of subplants 520 may include equipment that can be controlled by controller 506 to optimize the performance of system 550. Subplant equipment may include, for example, heating devices, chillers, heat recovery heat exchangers, cooling towers, pumps, valves, and/or other devices of subplants 520. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from controller 506.

In some embodiments, one or more of subplants 520 includes a subplant level controller configured to control the equipment of the corresponding subplant. For example, controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, energy cost optimization system 550 and controller 506 include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6A:
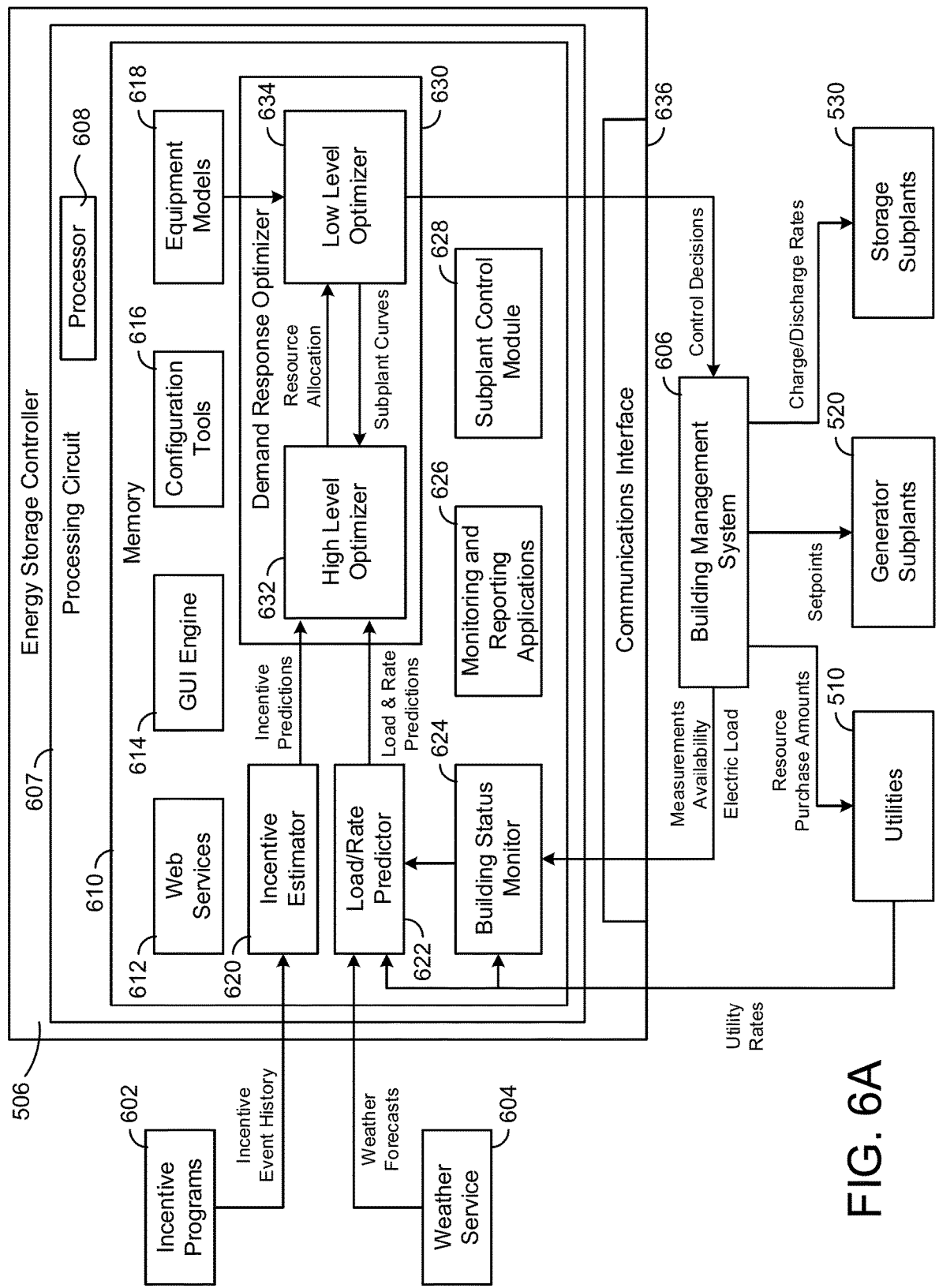
FIG. 6A is block diagram of an energy storage controller which may be used to operate the energy storage system of FIG. 5A, according to an exemplary embodiment.

Referring now to FIG. 6A, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for multiple time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may be integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6A, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6A, memory 610 is shown to include a load/rate predictor 622. Load/rate predictor 622 may be configured to predict the thermal energy loads ($\ell$) of the building or campus for each time step k (e.g., k=1 n) of an optimization period. Load/rate predictor 622 is shown receiving weather forecasts from a weather service 604. In some embodiments, load/rate predictor 622 predicts the thermal energy loads $\hat{\ell}_k$ as a function of the weather forecasts. In some embodiments, load/rate predictor 622 uses feedback from BMS 606 to predict loads $\hat{\ell}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{\ell}_k$ as a function of a given weather forecast ($\hat{\phi}_w$), a day type (clay), the time of day (t), and previous measured load data ($Y_{k-1}$). Such a relationship is expressed in the following equation:

$$\hat{\ell}_k = f(\hat{\phi}_w, day, t | Y_{k-1})$$

In some embodiments, load/rate predictor 622 uses a deterministic plus stochastic model trained from historical load data to predict loads $\hat{\ell}_k$. Load/rate predictor 622 may use any of a variety of prediction methods to predict load $\hat{\ell}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{\ell}_{Hot,k}$ and a cold water load $\hat{\ell}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period.

Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6A, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6A, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6A, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6A, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616.

Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Energy Cost Optimization Controller

Figure 6B:
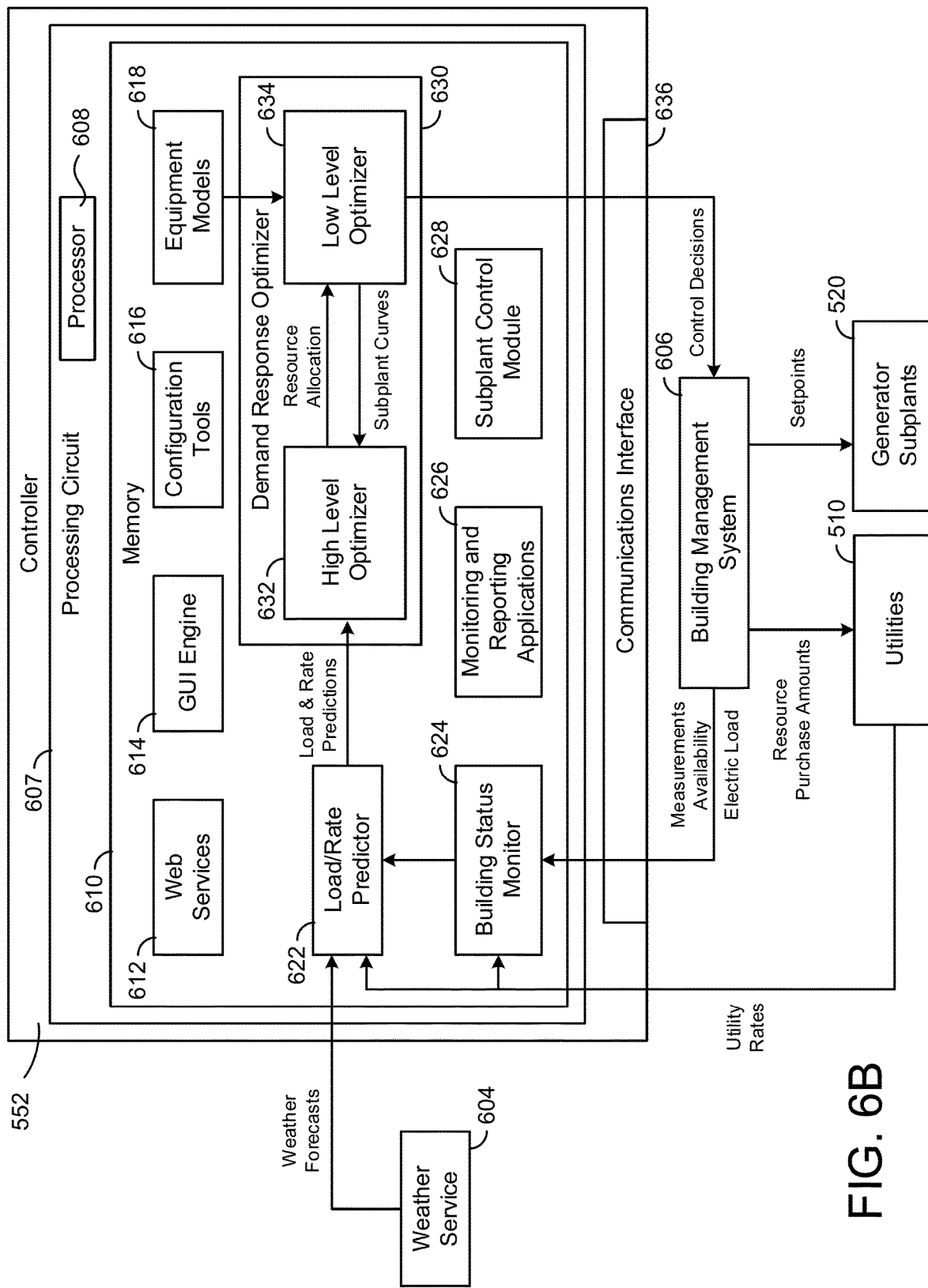
FIG. 6B is a block diagram of a controller which may be used to operate the energy cost optimization system of FIG. 5B, according to an exemplary embodiment.

Referring now to FIG. 6B, a block diagram illustrating controller 506 in greater detail is shown, according to an exemplary embodiment. Controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510 and/or setpoints for generator subplants 520.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520 to affect the monitored conditions within the building and to serve the thermal energy loads of the building.

BMS 606 may receive control signals from controller 506 specifying on/off states and/or setpoints for the subplant equipment. BMS 606 may control the equipment (e.g., via actuators, power relays, etc.) in accordance with the control signals provided by controller 506. For example, BMS 606 may operate the equipment using closed loop control to achieve the setpoints specified by energy storage controller 506. In various embodiments, BMS 606 may be combined with controller 506 or may be part of a separate building management system. According to an exemplary embodiment, BMS 606 is a METASYS® brand building management system, as sold by Johnson Controls, Inc.

Controller 506 may monitor the status of the controlled building using information received from BMS 606. Controller 506 may be configured to predict the thermal energy loads (e.g., heating loads, cooling loads, etc.) of the building for multiple time steps in an optimization period (e.g., using weather forecasts from a weather service 604). Controller 506 may generate control decisions that optimize the economic value of operating system 550 over the duration of the optimization period subject to constraints on the optimization process (e.g., energy balance constraints, load satisfaction constraints, etc.). The optimization process performed by controller 506 is described in greater detail below.

Controller 506 is shown to include a communications interface 636 and a processing circuit 607 having a processor 608 and memory 610. These components may be the same as described with reference to FIG. 6A. For example, controller 506 is shown to include demand response optimizer 630. Demand response optimizer 630 may perform a cascaded optimization process to optimize the performance of system 550. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, resource purchase amounts for each type of resource purchased from utilities 510, and/or an amount of each resource sold to energy purchasers 504. In other words, the control decisions may define resource allocation at each time step.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. The cascaded optimization process performed by demand response optimizer 630 is described in greater detail in U.S. patent application Ser. No. 15/247,885. These and other components of controller 506 may be the same as previously described with reference to FIG. 6A.

Planning Tool

Figure 7:
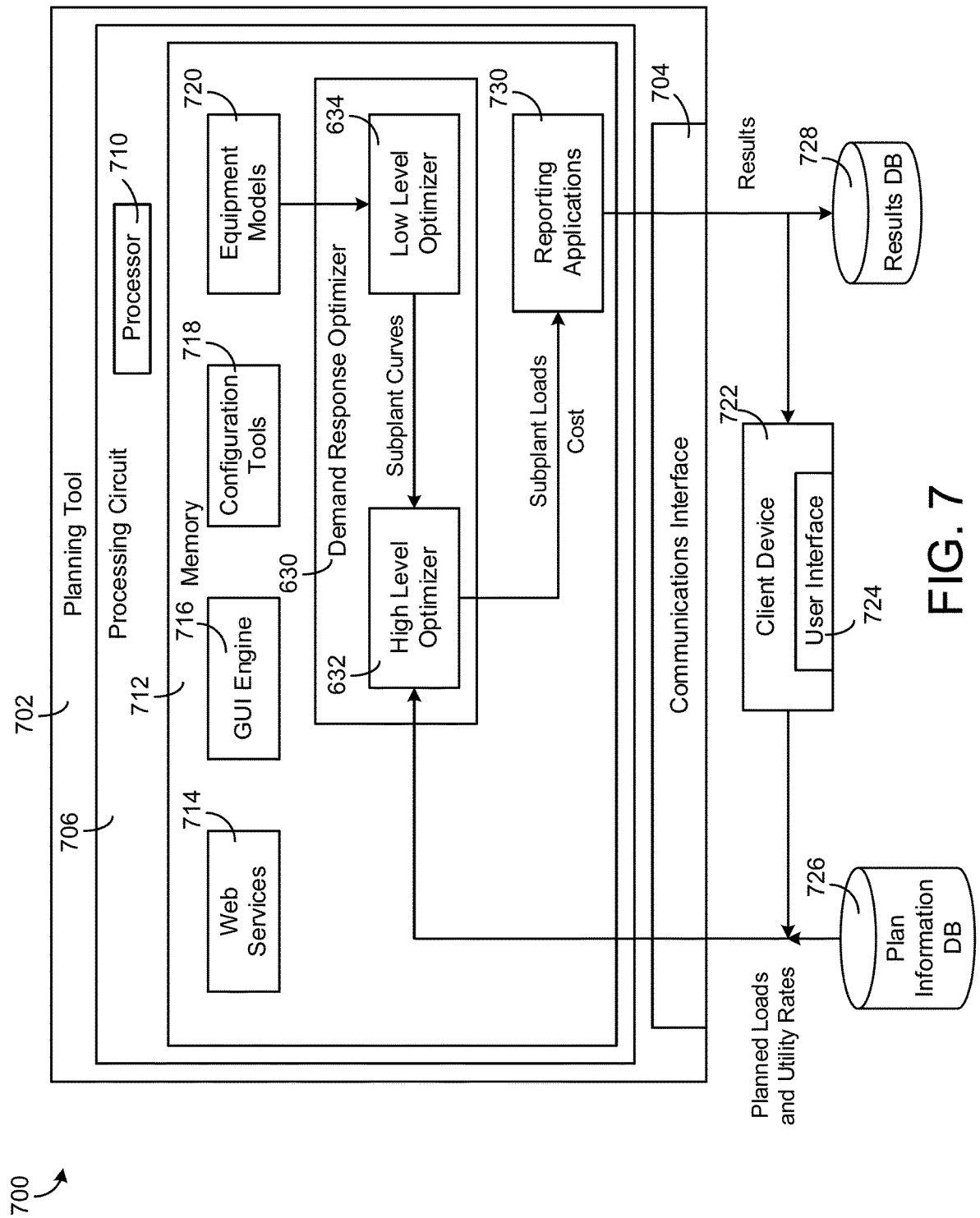
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIGS. 6A-6B. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5A. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
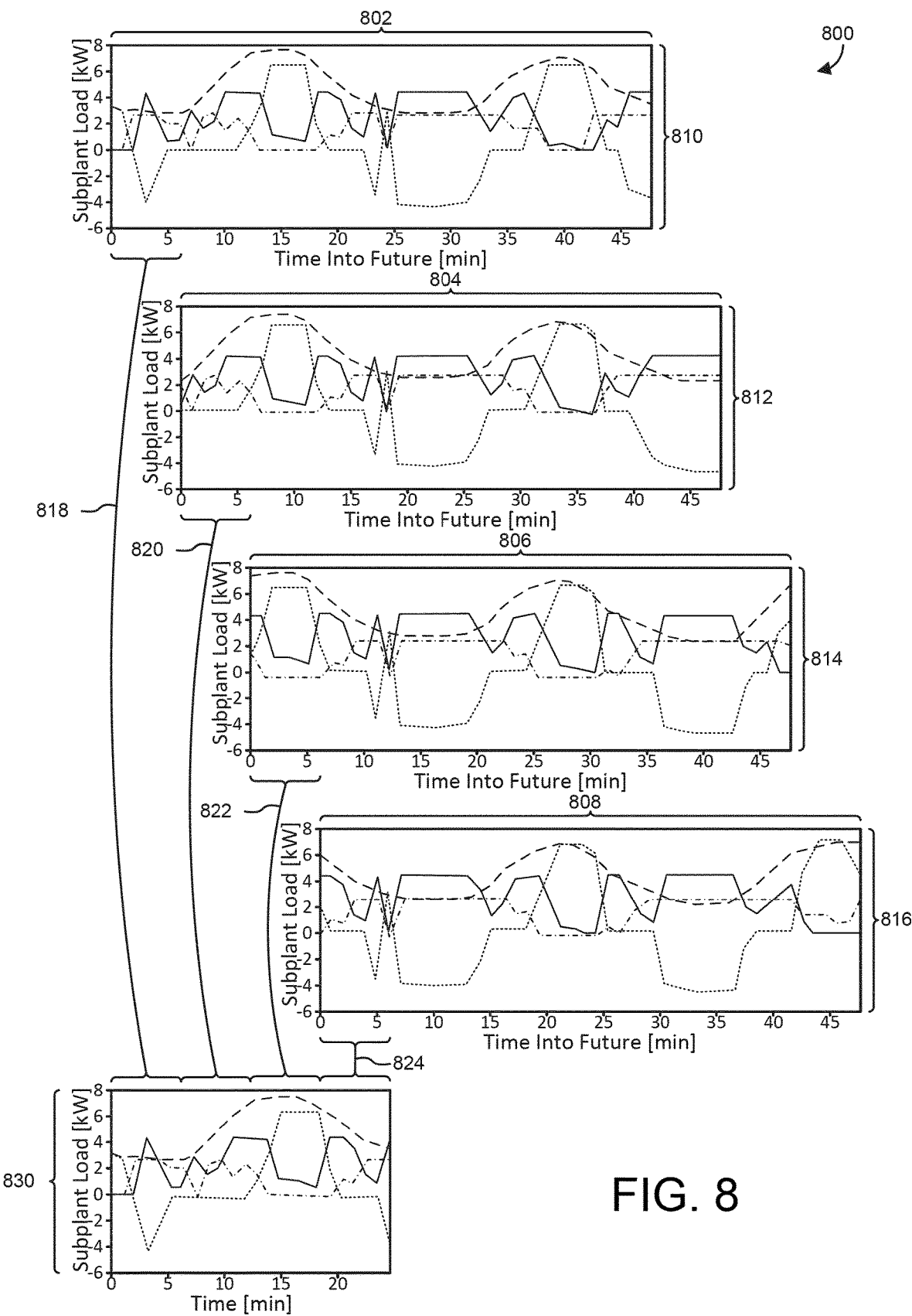
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

Resource Allocation Optimization

Figure 9:
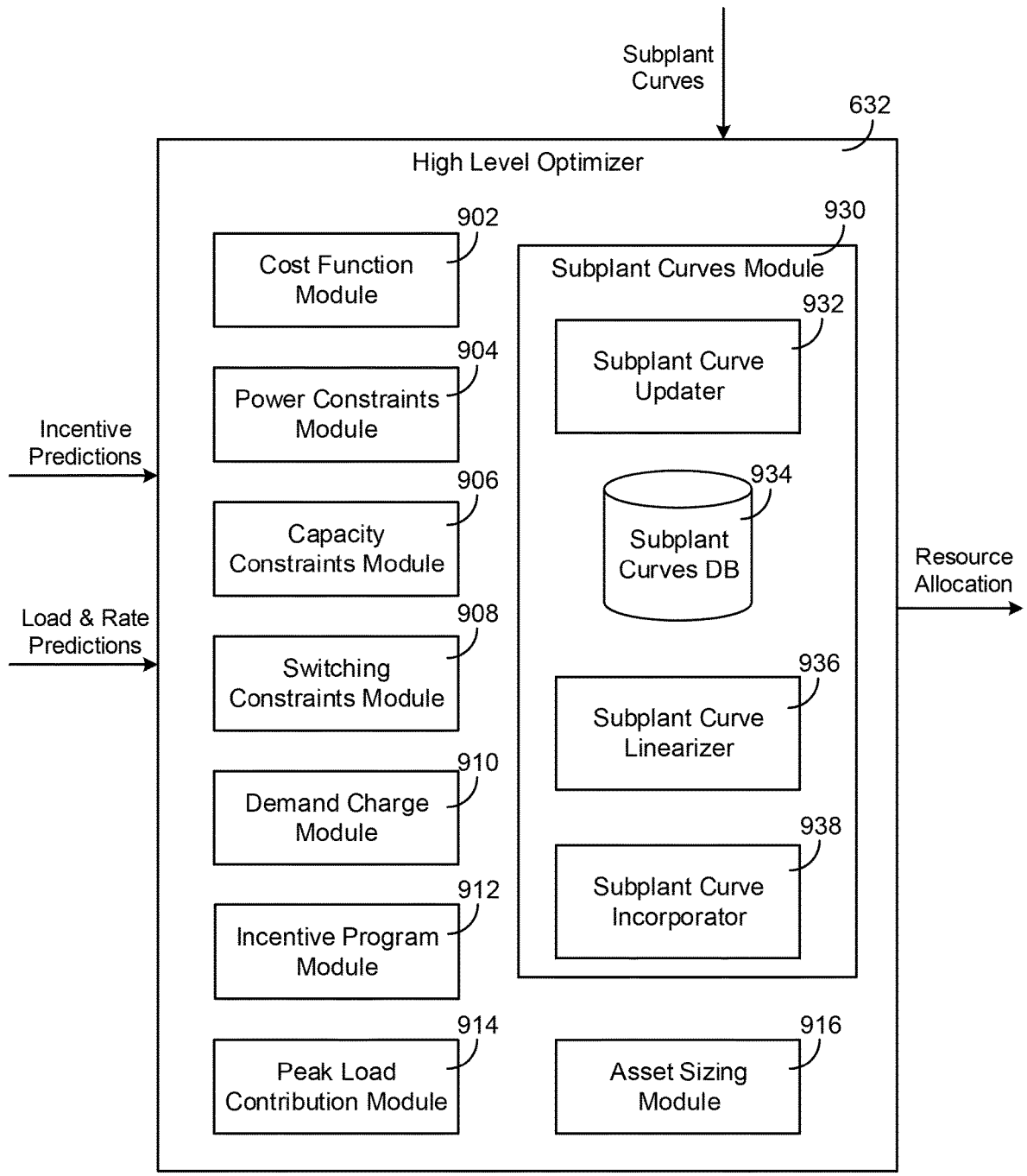
FIG. 9 is a block diagram of a high level optimizer which can be implemented as a component of the controllers of FIGS. 6A-6B or the planning tool of FIG. 7, according to an exemplary embodiment.

Referring now to FIG. 9, a block diagram illustrating high level optimizer 632 in greater detail is shown, according to an exemplary embodiment. In some embodiments, high level optimizer 632 may be implemented as a component of energy storage controller 506, as described with reference to FIGS. 5A and 6A. In other embodiments, high level optimizer 632 may be implemented as a component of controller 506, as described with reference to FIGS. 5B and 6B. In other embodiments, high level optimizer 632 may be implemented as a component of planning tool 702, as described with reference to FIGS. 7-8.

High level optimizer 632 may receive load and rate predictions from load/rate predictor 622, incentive predictions from incentive estimator 620, and subplant curves from low level optimizer 634. High level optimizer 632 may determine an optimal resource allocation across energy storage system 500 as a function of the load and rate predictions, the incentive predictions, and the subplant curves. The optimal resource allocation may include an amount of each resource purchased from utilities 510, an amount of each input and output resource of generator subplants 520, an amount of each resource stored or withdrawn from storage subplants 530, and/or an amount of each resource sold to energy purchasers 504. In some embodiments, the optimal resource allocation maximizes the economic value of operating energy storage system 500 while satisfying the predicted loads for the building or campus.

High level optimizer 632 can be configured to optimize the utilization of a battery asset, such as battery 108, battery 306, and/or electrical energy storage subplant 533. A battery asset can be used to participate in IBDR programs which yield revenue and to reduce the cost of energy and the cost incurred from peak load contribution charges. High level optimizer 632 can use an optimization algorithm to optimally allocate a battery asset (e.g., by optimally charging and discharging the battery) to maximize its total value. In a planning tool framework, high level optimizer 632 can perform the optimization iteratively to determine optimal battery asset allocation for an entire simulation period (e.g., an entire year), as described with reference to FIG. 8. The optimization process can be expanded to include economic load demand response (ELDR) and can account for peak load contribution charges. High level optimizer 632 can allocate the battery asset at each time step (e.g., each hour) over a given horizon such that energy and demand costs are minimized and frequency regulation (FR) revenue maximized. These and other features of high level optimizer 632 are described in detail below.

Cost Function

Still referring to FIG. 9, high level optimizer 632 is shown to include a cost function module 902. Cost function module 902 can generate a cost function or objective function which represents the total operating cost of a system over a time horizon (e.g., one month, one year, one day, etc.). The system can include any of the systems previously described (e.g., frequency response optimization system 100, photovoltaic energy system 300, energy storage system 500, planning system 700, etc.) or any other system in which high level optimizer 632 is implemented. In some embodiments, the cost function can be expressed generically using the following equation:

$$\arg\min_{x} J(x)$$

where J(x) is defined as follows:

$$J(x) = \sum_{sources}\sum_{horizon} \text{cost}(\text{purchase}_{resource,time}, time) - \sum_{incentives}\sum_{horizon} \text{revenue}(ReservationAmount)$$

The first term in the previous equation represents the total cost of all resources purchased over the optimization horizon. Resources can include, for example, water, electricity, natural gas, or other types of resources purchased from a utility or other outside entity. The second term in the equation represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

High level optimizer 632 can optimize the cost function J(x) subject to the following constraint, which guarantees the balance between resources purchased, produced, discharged, consumed, and requested over the optimization horizon:

$$\sum_{sources} \text{purchase}_{resource,time} + \sum_{subplants} \text{produces}(x_{internal,time}, x_{external,time}, v_{uncontrolled,time}) - \sum_{subplants} \text{consumes}(x_{internal,time}, x_{external,time}, v_{uncontrolled,time}) + \sum_{storages} \text{discharges}_{resource}(x_{internal,time}, x_{external,time}) - \sum_{sinks} \text{requests}_{resource} = 0 \; \forall \text{ resources}, \forall \text{ time} \in \text{horizon}$$

where $x_{internal,time}$ and $x_{external,time}$ are internal and external decision variables and $v_{uncontrolled,time}$ includes uncontrolled variables.

The first term in the previous equation represents the total amount of each resource (e.g., electricity, water, natural gas, etc.) purchased from each source (e.g., utilities 510) over the optimization horizon. The second term represents the total consumption of each resource within the system (e.g., by generator subplants 520) over the optimization horizon. The third term represents the total amount of each resource discharged from storage (e.g., storage subplants 530) over the optimization horizon. Positive values indicate that the resource is discharged from storage, whereas negative values indicate that the resource is charged or stored. The fourth term represents the total amount of each resource requested by various resource sinks (e.g., building 502, energy purchasers 504, or other resource consumers) over the optimization horizon. Accordingly, this constraint ensures that the total amount of each resource purchased, produced, or discharged from storage is equal to the amount of each resource consumed, stored, or provided to the resource sinks.

In some embodiments, cost function module 902 separates the purchase cost of one or more resources into multiple terms. For example, cost function module 902 can separate the purchase cost of a resource into a first term corresponding to the cost per unit of the resource purchased (e.g., $/kWh of electricity, $/liter of water, etc.) and a second term corresponding to one or more demand charges. A demand charge is a separate charge on the consumption of a resource which depends on the maximum or peak resource consumption over a given period (i.e., a demand charge period). Cost function module 902 can express the cost function using the following equation:

$$J(x) = \sum_{s \in sources}\left[\sum_{q \in demands_s} w_{demand,s,q} r_{demand,s,q} \max_{i \in demands_{s,q}} (\text{purchase}_{s,i}) + \sum_{horizon} r_{s,i} \text{purchase}_{s,i}\right] - \sum_{incentives}\sum_{horizon} \text{revenue}(ReservationAmount)$$

where $r_{demand,s,q}$ is the qth demand charge associated with the peak demand of the resource provided by source s over the demand charge period, $w_{demand,s,q}$ is the weight adjustment of the qth demand charge associated with source s, and the max( ) term indicates the maximum amount of the resource purchased from source s at any time step i during the demand charge period. The variable $r_{s,i}$ indicates the cost per unit of the resource purchased from source s and the variable $\text{purchase}_{s,i}$ indicates the amount of the resource purchased from source s during the ith time step of the optimization period.

In some embodiments, the energy system in which high level optimizer 632 is implemented includes a battery asset (e.g., one or more batteries) configured to store and discharge electricity. If the battery asset is the only type of energy storage, cost function module 902 can simplify the cost function J(x) to the following equation:

$$J(x) = -\sum_{i=k}^{k+h-1} r_{e_i} P_{bat_i} - \sum_{i=k}^{k+h-1} r_{FR_i} P_{FR_i} +$$

-continued $$\sum_{i=k}^{k+h-1} r_{s_i}|P_{bat_i} - P_{bat_{i-1}}| + w_d r_d \max_i(-P_{bat_i} + eLoad_i)$$

where h is the duration of the optimization horizon, $P_{bat_i}$ is the amount of power (e.g., kW) discharged from the battery asset during the ith time step of the optimization horizon for use in reducing the amount of power purchased from an electric utility, $r_{e_i}$ is the price of electricity (e.g., $/kWh) at time step i, $P_{FR,i}$ is the battery power (e.g., kW) committed to frequency regulation participation during time step i, $r_{FR_i}$ is the incentive rate (e.g., $/kWh) for participating in frequency regulation during time step i, $r_d$ is the applicable demand charge (e.g., $/kWh) associated with the maximum electricity consumption during the corresponding demand charge period, $w_d$ is a weight adjustment of the demand charge over the horizon, and the max( ) term selects the maximum amount electricity purchased from the electric utility (e.g., kW) during any time step i of the applicable demand charge period.

In the previous expression of the cost function J(x), the first term represents the cost savings resulting from the use of battery power to satisfy the electric demand of the facility relative to the cost which would have been incurred if the electricity were purchased from the electric utility. The second term represents the amount of revenue derived from participating in the frequency regulation program. The third term represents a switching penalty imposed for switching the battery power $P_{bat}$ between consecutive time steps. The fourth term represents the demand charge associated with the maximum amount of electricity purchased from the electric utility. The amount of electricity purchased may be equal to the difference between the electric load of the facility $eLoad_i$ (i.e., the total amount of electricity required) at time step i and the amount of power discharged from the battery asset $P_{bat_i}$ at time step i. In a planning tool framework, historical data of the electric load eLoad over the horizon can be provided as a known input. In an operational mode, the electric load eLoad can be predicted for each time step of the optimization period.

Optimization Constraints

Still referring to FIG. 9, high level optimizer 632 is shown to include a power constraints module 904. Power constraints module 904 may be configured to impose one or more power constraints on the objective function J(x). In some embodiments, power constraints module 904 generates and imposes the following constraints:

$$P_{bat_i} + P_{FR_i} \leq P_{eff}$$

$$-P_{bat_i} + P_{FR_i} \leq P_{eff}$$

$$P_{bat_i} + P_{FR_i} \leq eLoad_i$$

where $P_{bat_i}$ is the amount of power discharged from the battery at time step i for use in satisfying electric demand and reducing the demand charge, $P_{FR_i}$ is the amount of battery power committed to frequency regulation at time step i, $P_{eff}$ is the effective power available (e.g., the maximum rate at which the battery can be charged or discharged), and $eLoad_i$ is the total electric demand at time step i.

The first two power constraints ensure that the battery is not charged or discharged at a rate that exceeds the maximum battery charge/discharge rate $P_{eff}$. If the system includes photovoltaic (PV) power generation, the effective power available $P_{eff}$ can be calculated as follows:

$$P_{eff} = P_{rated} - P_{PV\ FirmingReserve}$$

where $P_{rated}$ is the rated capacity of the battery and $P_{PV\ FirmingReserve}$ is the PV firming reserve power. The third power constraint ensures that energy stored in the battery is not sold or exported to the energy grid. In some embodiments, power constraints module 904 can remove the third power constraint if selling energy back to the energy grid is a desired feature or behavior of the system.

Still referring to FIG. 9, high level optimizer 632 is shown to include a capacity constraints module 906. Capacity constraints module 906 may be configured to impose one or more capacity constraints on the objective function J(x). The capacity constraints may be used to relate the battery power $P_{bat}$ charged or discharged during each time step to the capacity and state-of-charge (SOC) of the battery. The capacity constraints may ensure that the SOC of the battery is maintained within acceptable lower and upper bounds and that sufficient battery capacity is available for frequency regulation. In some embodiments, the lower and upper bounds are based on the battery capacity needed to reserve the amount of power committed to frequency regulation $P_{FR_i}$ during each time step i.

In some embodiments, capacity constraints module 906 generates two sets of capacity constraints. One set of capacity constraints may apply to the boundary condition at the end of each time step i, whereas the other set of capacity constraints may apply to the boundary condition at the beginning of the next time step i+1. For example, if a first amount of battery capacity is reserved for frequency regulation during time step i and a second amount of battery capacity is reserved for frequency regulation during time step i+1, the boundary point between time step i and i+1 may be required to satisfy the capacity constraints for both time step i and time step i+1. This ensures that the decisions made for the power committed to frequency regulation during the current time step i and the next time step i+1 represent a continuous change in the SOC of the battery.

In some embodiments, capacity constraints module 906 generates the following capacity constraints:

$$\begin{cases} C_a - \sum_{n=k}^{i} P_{bat_n} \leq C_{eff} - C_{FR}P_{FR_i} \\ C_a - \sum_{n=k}^{i} P_{bat_n} \geq C_{FR}P_{FR_i} \end{cases} \forall i = k \ldots k+h-1$$

$$\begin{cases} C_a - \sum_{n=k}^{i} P_{bat_n} \leq C_{eff} - C_{FR}P_{FR_{i+1}} \\ C_a - \sum_{n=k}^{i} P_{bat_n} \geq C_{FR}P_{FR_{i+1}} \end{cases} \forall i = k \ldots k+h-2$$

where $C_a$ is the available battery capacity (e.g., kWh), $C_{FR}$ is the frequency regulation reserve capacity (e.g., kWh/kW) which translates the amount of battery power committed to frequency regulation $P_{FR}$ into an amount of energy needed to be reserved, and $C_{eff}$ is the effective capacity of the battery.

The first set of constraints ensures that the battery capacity at the end of each time step i (i.e., available capacity $C_a$ minus the battery power discharged through time step i) is maintained between the lower capacity bound $C_{FR}P_{FR_i}$ and the upper capacity bound $C_{eff} - C_{FR}P_{FR_i}$ for time step i. The lower capacity bound $C_{FR}P_{FR_i}$ represents the minimum capacity required to reserve $P_{FR_i}$ for frequency regulation during time step i, whereas the upper capacity bound $C_{eff} - C_{FR}P_{FR_i}$ represents maximum capacity required to reserve $P_{FR_i}$ for frequency regulation during time step i. Similarly, the second set of constraints ensures that the battery capacity at the end of each time step i (i.e., available capacity $C_a$ minus the battery power discharged through time step i) is maintained between the lower capacity bound $C_{FR}P_{FR_{i+1}}$ and the upper capacity bound $C_{eff} - C_{FR}P_{FR_{i+1}}$ for time step i+1. The lower capacity bound $C_{FR}P_{FR_{i+1}}$ represents the minimum capacity required to reserve $P_{FR_{i+1}}$ for frequency regulation during time step i+1, whereas the upper capacity bound $C_{eff} - C_{FR}P_{FR_{i+1}}$ represents maximum capacity required to reserve $P_{FR_{i+1}}$ for frequency regulation during time step i+1.

In some embodiments, capacity constraints module 906 calculates the effective capacity of the battery $C_{eff}$ as a percentage of the rated capacity of the battery. For example, if frequency regulation and photovoltaic power generation are both enabled and the SOC control margin is non-zero, capacity constraints module 906 can calculate the effective capacity of the battery $C_{eff}$ using the following equation:

$$C_{eff} = (1 - C_{FR} - 2C_{socCM})C_{rated} - C_{PV\,Firming\,Reserve}$$

where $C_{socCM}$ is the control margin and $C_{PV\,FirmingReserve}$ is the capacity reserved for photovoltaic firming.

Still referring to FIG. 9, high level optimizer 632 is shown to include a switching constraints module 908. Switching constraints module 908 may be configured to impose one or more switching constraints on the cost function J(x). As previously described, the cost function J(x) may include the following switching term:

$$\sum_{i=k}^{k+h-1} r_{s_i} |P_{bat_i} - P_{bat_{i-1}}|$$

which functions as a penalty for switching the battery power $P_{bat}$ between consecutive time steps i and i−1. Notably, the switching term is nonlinear as a result of the absolute value function.

Switching constraints module 908 can impose constraints which represent the nonlinear switching term in a linear format. For example, switching constraints module 908 can introduce an auxiliary switching variable $s_i$ and constrain the auxiliary switching variable to be greater than the difference between the battery power $P_{bat_i}$ at time step i and the battery power $P_{bat_{i-1}}$ at time step i−1, as shown in the following equations:

$$s_i > P_{bat_i} P_{bat_{i-1}}$$

$$s_i > P_{bat_{i-1}} - P_{bat_i}$$

$$\forall i = k \ldots k+h-1$$

Switching constraints module 908 can replace the nonlinear switching term in the cost function J(x) with the following linearized term:

$$\sum_{i=k}^{k+h-1} r_{s_i} s_i$$

which can be optimized using any of a variety of linear optimization techniques (e.g., linear programming) subject to the constraints on the auxiliary switching variable $s_i$.

Demand Charge Incorporation

Still referring to FIG. 9, high level optimizer 632 is shown to include a demand charge module 910. Demand charge module 910 can be configured to modify the cost function J(x) and the optimization constraints to account for one or more demand charges. As previously described, demand charges are costs imposed by utilities 510 based on the peak consumption of a resource from utilities 510 during various demand charge periods (i.e., the peak amount of the resource purchased from the utility during any time step of the applicable demand charge period). For example, an electric utility may define one or more demand charge periods and may impose a separate demand charge based on the peak electric consumption during each demand charge period. Electric energy storage can help reduce peak consumption by storing electricity in a battery when energy consumption is low and discharging the stored electricity from the battery when energy consumption is high, thereby reducing peak electricity purchased from the utility during any time step of the demand charge period.

In some instances, one or more of the resources purchased from utilities 510 are subject to a demand charge or multiple demand charges. There are many types of potential demand charges as there are different types of energy rate structures. The most common energy rate structures are constant pricing, time of use (TOU), and real time pricing (RTP). Each demand charge may be associated with a demand charge period during which the demand charge is active. Demand charge periods can overlap partially or completely with each other and/or with the optimization period. Demand charge periods can include relatively long periods (e.g., monthly, seasonal, annual, etc.) or relatively short periods (e.g., days, hours, etc.). Each of these periods can be divided into several sub-periods including off-peak, partial-peak, and/or on-peak. Some demand charge periods are continuous (e.g., beginning Jan. 1, 2017 and ending Jan. 31, 2017), whereas other demand charge periods are non-continuous (e.g., from 11:00 AM-1:00 PM each day of the month).

Over a given optimization period, some demand charges may be active during some time steps that occur within the optimization period and inactive during other time steps that occur during the optimization period. Some demand charges may be active over all the time steps that occur within the optimization period. Some demand charges may apply to sometime steps that occur during the optimization period and other time steps that occur outside the optimization period (e.g., before or after the optimization period). In some embodiments, the durations of the demand charge periods are significantly different from the duration of the optimization period.

Advantageously, demand charge module 910 may be configured to account for demand charges in the high level optimization process performed by high level optimizer 632. In some embodiments, demand charge module 910 incorporates demand charges into the optimization problem and the cost function J(x) using demand charge masks and demand charge rate weighting factors. Each demand charge mask may correspond to a particular demand charge and may indicate the time steps during which the corresponding demand charge is active and/or the time steps during which the demand charge is inactive. Each rate weighting factor may also correspond to a particular demand charge and may scale the corresponding demand charge rate to the time scale of the optimization period.

As described above, the demand charge term of the cost function J(x) can be expressed as:

$$J(x) = \ldots \sum_{s \in sources} \sum_{q \in demands_s} w_{demand,s,q} r_{demand,s,q} \max_{i \in demands_{s,q}} (purchase_{s,i}) \ldots$$

where the max( ) function selects the maximum amount of the resource purchased from source s during any time step i that occurs during the optimization period. However, the demand charge period associated with demand charge q may not cover all of the time steps that occur during the optimization period. In order to apply the demand charge q to only the time steps during which the demand charge q is active, demand charge module 910 can add a demand charge mask to the demand charge term as shown in the following equation:

$$J(x) = \\ \ldots \sum_{s \in sources} \sum_{q \in demands_s} w_{demand,s,q} r_{demand,s,q} \max_{i \in demands_{s,q}} (g_{s,q,i} purchase_{s,i}) \ldots$$

where $g_{s,q,i}$ is an element of the demand charge mask.

The demand charge mask may be a logical vector including an element $g_{s,q,i}$ for each time step i that occurs during the optimization period. Each element $g_{s,q,i}$ of the demand charge mask may include a binary value (e.g., a one or zero) that indicates whether the demand charge q for source s is active during the corresponding time step i of the optimization period. For example, the element $g_{s,q,i}$ may have a value of one (i.e., $g_{s,q,i}=1$) if demand charge q is active during time step i and a value of zero (i.e., $g_{s,q,i}=0$) if demand charge q is inactive during time step i. An example of a demand charge mask is shown in the following equation:

$$g_{s,q}=[0,0,0,1,1,1,1,0,0,0,1,1]^T$$

where $g_{s,q,1}$, $g_{s,q,2}$, $g_{s,q,3}$, $g_{s,q,8}$, $g_{s,q,9}$, and $g_{s,q,10}$ have values of zero, whereas $g_{s,q,4}$, $g_{s,q,5}$, $g_{s,q,6}$, $g_{s,q,7}$, $g_{s,q,11}$, and $g_{s,q,12}$ have values of one. This indicates that the demand charge q is inactive during time steps i=1, 2, 3, 8, 9, 10 (i.e., $g_{s,q,i}=0$ $\forall i=1, 2, 3, 8, 9, 10$) and active during time steps i=4, 5, 6, 7, 11, 12 (i.e., $g_{s,q,i}=1$ $\forall i=4, 5, 6, 7, 11, 12$). Accordingly, the term $g_{s,q,i}$ $purchase_{s,i}$ within the max( ) function may have a value of zero for all time steps during which the demand charge q is inactive. This causes the max( ) function to select the maximum purchase from source s that occurs during only the time steps for which the demand charge q is active.

In some embodiments, demand charge module 910 calculates the weighting factor $w_{demand,s,q}$ for each demand charge q in the cost function J(x). The weighting factor $w_{demand,s,q}$ may be a ratio of the number of time steps the corresponding demand charge q is active during the optimization period to the number of time steps the corresponding demand charge q is active in the remaining demand charge period (if any) after the end of the optimization period. For example, demand charge module 910 can calculate the weighting factor $w_{demand,s,q}$ using the following equation:

$$w_{demand,s,q} = \frac{\sum_{i=k}^{k+h-1} g_{s,q,i}}{\sum_{i=k+h}^{period\_end} g_{s,q,i}}$$

where the numerator is the summation of the number of time steps the demand charge q is active in the optimization period (i.e., from time step k to time step k+h−1) and the denominator is the number of time steps the demand charge q is active in the portion of the demand charge period that occurs after the optimization period (i.e., from time step k+h to the end of the demand charge period). The following example illustrates how demand charge module 910 can incorporate multiple demand charges into the cost function J(x). In this example, a single source of electricity (e.g., an electric grid) is considered with multiple demand charges applicable to the electricity source (i.e., q=1 N, where N is the total number of demand charges). The system includes a battery asset which can be allocated over the optimization period by charging or discharging the battery during various time steps. Charging the battery increases the amount of electricity purchased from the electric grid, whereas discharging the battery decreases the amount of electricity purchased from the electric grid.

Demand charge module 910 can modify the cost function J(x) to account for the N demand charges as shown in the following equation:

where the term $-P_{bat_i}+eLoad_i$ represents the total amount of electricity purchased from the electric grid during time step i (i.e., the total electric load $eLoad_i$ minus the power discharged from the battery $P_{bat_i}$. Each demand charge q=1 . . . N can be accounted for separately in the cost function J(x) by including a separate max( ) function for each of the N demand charges. The parameter $r_{d_q}$ indicates the demand charge rate associated with the qth demand charge (e.g., \$/kW) and the weighting factor $w_{d_q}$ indicates the weight applied to the qth demand charge.

Demand charge module 910 can augment each max( ) function with an element $g_{q_i}$ of the demand charge mask for the corresponding demand charge. Each demand charge mask may be a logical vector of binary values which indicates whether the corresponding demand charge is active or inactive at each time step i of the optimization period. Accordingly, each max( ) function may select the maximum electricity purchase during only the time steps the corresponding demand charge is active. Each max( ) function can be multiplied by the corresponding demand charge rate $r_{d_q}$ and the corresponding demand charge weighting factor $w_{d_q}$ to determine the total demand charge resulting from the battery allocation $P_{bat}$ over the duration of the optimization period.

In some embodiments, demand charge module 910 linearizes the demand charge terms of the cost function J(x) by introducing an auxiliary variable $d_q$ for each demand charge q. In the case of the previous example, this will result in N auxiliary variables $d_1$ . . . $d_N$ being introduced as decision variables in the cost function J(x). Demand charge module 910 can modify the cost function J(x) to include the linearized demand charge terms as shown in the following equation:

$$J(x)= \ldots +w_{d_1}r_{d_1}d_1+ \ldots +w_{d_q}r_{d_q}d_q+ \ldots +w_{d_N}r_{d_N}d_N$$

Demand charge module 910 can impose the following constraints on the auxiliary demand charge variables $d_1$ . . . $d_N$ to ensure that each auxiliary demand charge variable represents the maximum amount of electricity purchased from the electric utility during the applicable demand charge period:

$$d_1 \geq g_{1_i}(-P_{bat_i} + eLoad_i) \quad \forall\, i = k \ldots k+h-1,\ g_{1_i} \neq 0$$

$$d_1 \geq 0 \qquad \vdots$$

$$d_q \geq g_{q_i}(-P_{bat_i} + eLoad_i) \quad \forall\, i = k \ldots k+h-1,\ g_{q_i} \neq 0$$

$$d_q \geq 0 \qquad \vdots$$

$$d_N \geq g_{N_i}(-P_{bat_i} + eLoad_i) \quad \forall\, i = k \ldots k+h-1,\ g_{N_i} \neq 0$$

$$d_N \geq 0$$

In some embodiments, the number of constraints corresponding to each demand charge q is dependent on how many time steps the demand charge q is active during the optimization period. For example, the number of constraints for the demand charge q may be equal to the number of non-zero elements of the demand charge mask $g_q$. Furthermore, the value of the auxiliary demand charge variable $d_q$ at each iteration of the optimization may act as the lower bound of the value of the auxiliary demand charge variable $d_q$ at the following iteration.

Consider the following example of a multiple demand charge structure. In this example, an electric utility imposes three monthly demand charges. The first demand charge is an all-time monthly demand charge of 15.86 $/kWh which applies to all hours within the entire month. The second demand charge is an on-peak monthly demand charge of 1.56 $/kWh which applies each day from 12:00-18:00. The third demand charge is a partial-peak monthly demand charge of 0.53 $/kWh which applies each day from 9:00-12:00 and from 18:00-22:00.

For an optimization period of one day and a time step of one hour (i.e., i=1 . . . 24), demand charge module 910 may introduce three auxiliary demand charge variables. The first auxiliary demand charge variable $d_1$ corresponds to the all-time monthly demand charge; the second auxiliary demand charge variable $d_2$ corresponds to the on-peak monthly demand charge; and the third auxiliary demand charge variable $d_3$ corresponds to the partial-peak monthly demand charge. Demand charge module 910 can constrain each auxiliary demand charge variable to be greater than or equal to the maximum electricity purchase during the hours the corresponding demand charge is active, using the inequality constraints described above.

Demand charge module 910 can generate a demand charge mask $g_q$ for each of the three demand charges (i.e., q=1 . . . 3), where $g_q$ includes an element for each time step of the optimization period (i.e., $g_q = [g_{q_1} \ldots g_{q_{24}}]$). The three demand charge masks can be defined as follows:

$$g_{1_i} = 1\ \forall\, i = 1 \ldots 24$$

$$g_{2_i} = 1\ \forall\, i = 12 \ldots 18$$

$$g_{3_i} = 1\ \forall\, i = 9 \ldots 12, 18 \ldots 22$$

with all other elements of the demand charge masks equal to zero. In this example, it is evident that more than one demand charge constraint will be active during the hours which overlap with multiple demand charge periods. Also, the weight of each demand charge over the optimization period can vary based on the number of hours the demand charge is active, as previously described.

In some embodiments, demand charge module 910 considers several different demand charge structures when incorporating multiple demand charges into the cost function J(x) and optimization constraints. Demand charge structures can vary from one utility to another, or the utility may offer several demand charge options. In order to incorporate the multiple demand charges within the optimization framework, a generally-applicable framework can be defined as previously described. Demand charge module 910 can translate any demand charge structure into this framework. For example, demand charge module 910 can characterize each demand charge by rates, demand charge period start, demand charge period end, and active hours. Advantageously, this allows demand charge module 910 to incorporate multiple demand charges in a generally-applicable format.

The following is another example of how demand charge module 910 can incorporate multiple demand charges into the cost function J(x). Consider, for example, monthly demand charges with all-time, on-peak, partial-peak, and off-peak. In this case, there are four demand charge structures, where each demand charge is characterized by twelve monthly rates, twelve demand charge period start (e.g., beginning of each month), twelve demand charge period end (e.g., end of each month), and hoursActive. The hoursActive is a logical vector where the hours over a year where the demand charge is active are set to one. When running the optimization over a given horizon, demand charge module 910 can implement the applicable demand charges using the hoursActive mask, the relevant period, and the corresponding rate.

In the case of an annual demand charge, demand charge module 910 can set the demand charge period start and period end to the beginning and end of a year. For the annual demand charge, demand charge module 910 can apply a single annual rate. The hoursActive demand charge mask can represent the hours during which the demand charge is active. For an annual demand charge, if there is an all-time, on-peak, partial-peak, and/or off-peak, this translates into at most four annual demand charges with the same period start and end, but different hoursActive and different rates.

In the case of a seasonal demand charge (e.g., a demand charge for which the maximum peak is determined over the indicated season period), demand charge module 910 can represent the demand charge as an annual demand charge. Demand charge module 910 can set the demand charge period start and end to the beginning and end of a year. Demand charge module 910 can set the hoursActive to one during the hours which belong to the season and to zero otherwise. For a seasonal demand charge, if there is an All-time, on-peak, partial, and/or off-peak, this translates into at most four seasonal demand charges with the same period start and end, but different hoursActive and different rates.

In the case of the average of the maximum of current month and the average of the maxima of the eleven previous months, demand charge module 910 can translate the demand charge structure into a monthly demand charge and an annual demand charge. The rate of the monthly demand charge may be half of the given monthly rate and the annual rate may be the sum of given monthly rates divided by two. These and other features of demand charge module 910 are described in greater detail in U.S. patent application Ser. No. 15/405,236 filed Jan. 12, 2017, the entire disclosure of which is incorporated by reference herein.

Incentive Program Incorporation

Referring again to FIG. 9, high level optimizer 632 is shown to include an incentive program module 912. Incentive program module 912 may modify the optimization problem to account for revenue from participating in an incentive-based demand response (IBDR) program. IBDR programs may include any type of incentive-based program that provides revenue in exchange for resources (e.g., electric power) or a reduction in a demand for such resources. For example, energy storage system 500 may provide electric power to an energy grid or an independent service operator as part of a frequency response program (e.g., PJM frequency response) or a synchronized reserve market. In a frequency response program, a participant contracts with an electrical supplier to maintain reserve power capacity that can be supplied or removed from an energy grid by tracking a supplied signal. The participant is paid by the amount of power capacity required to maintain in reserve. In other types of IBDR programs, energy storage system 500 may reduce its demand for resources from a utility as part of a load shedding program. It is contemplated that energy storage system 500 may participate in any number and/or type of IBDR programs.

In some embodiments, incentive program module 912 modifies the cost function J(x) to include revenue generated from participating in an economic load demand response (ELDR) program. ELDR is a type of IBDR program and similar to frequency regulation. In ELDR, the objective is to maximize the revenue generated by the program, while using the battery to participate in other programs and to perform demand management and energy cost reduction. To account for ELDR program participation, incentive program module 912 can modify the cost function J(x) to include the following term:

$$\min_{b_i, P_{bat_i}} \left( -\sum_{i=k}^{k+h-1} b_i r_{ELDR_i} (adjCBL_i - (eLoad_i - P_{bat_i})) \right)$$

where $b_i$ is a binary decision variable indicating whether to participate in the ELDR program during time step i, $r_{ELDR_i}$ is the ELDR incentive rate at which participation is compensated, and $adjCBL_i$ is the symmetric additive adjustment (SAA) on the baseline load. The previous expression can be rewritten as:

$$\min_{b_i, P_{bat_i}} \left( -\sum_{i=k}^{k+h-1} b_i r_{ELDR_i} \left( \left( \sum_{l=1}^{4} \frac{e_{li}}{4} + \sum_{p=m-4}^{m-2} \frac{1}{3} \left( eLoad_p - P_{bat_p} - \sum_{l=1}^{4} \frac{e_{lp}}{4} \right) - (eLoad_i - P_{bat_i}) \right) \right) \right)$$

where $e_{li}$ and $e_{lp}$ are the electric loads at the lth hour of the operating day.

In some embodiments, incentive program module 912 handles the integration of ELDR into the optimization problem as a bilinear problem with two multiplicative decision variables. In order to linearize the cost function J(x) and customize the ELDR problem to the optimization framework, several assumptions may be made. For example, incentive program module 912 can assume that ELDR participation is only in the real-time market, balancing operating reserve charges and make whole payments are ignored, day-ahead prices are used over the horizon, real-time prices are used in calculating the total revenue from ELDR after the decisions are made by the optimization algorithm, and the decision to participate in ELDR is made in advance and passed to the optimization algorithm based on which the battery asset is allocated.

In some embodiments, incentive program module 912 calculates the participation vector $b_i$ as follows:

$$b_i = \begin{cases} 1 & \forall i / r_{DA_i} \geq NBT_i \text{ and } i \in S \\ 0 & \text{otherwise} \end{cases}$$

where $r_{DA_i}$ is the hourly day-ahead price at the ith hour, $NBT_i$ is the net benefits test value corresponding to the month to which the corresponding hour belongs, and S is the set of nonevent days. Nonevent days can be determined for the year by choosing to participate every x number of days with the highest day-ahead prices out of y number of days for a given day type. This approach may ensure that there are nonevent days in the 45 days prior to a given event day when calculating the CBL for the event day.

Given these assumptions and the approach taken by incentive program module 912 to determine when to participate in ELDR, incentive program module 912 can adjust the cost function J(x) as follows:

$$J(x) = -\sum_{i=k}^{k+h-1} r_{e_i} P_{bat_i} - \sum_{i=k}^{k+h-1} r_{FR_i} P_{FR_i} +$$

$$\sum_{i=k}^{k+h-1} r_{s_i} s_i + w_d r_d d - \sum_{i=k}^{k+h-1} b_i r_{DA_i} \left( \sum_{p=m-4}^{m-2} -\frac{1}{3} P_{bat_p} + P_{bat_i} \right)$$

where $b_i$ and m are known over a given horizon. The resulting term corresponding to ELDR shows that the rates at the ith participation hour are doubled and those corresponding to the SAA are lowered. This means it is expected that high level optimizer 632 will tend to charge the battery during the SAA hours and discharge the battery during the participation hours. Notably, even though a given hour is set to be an ELDR participation hour, high level optimizer 632 may not decide to allocate any of the battery asset during that hour. This is due to the fact that it may be more beneficial at that instant to participate in another incentive program or to perform demand management.

Peak Load Contribution Incorporation

Still referring to FIG. 9, high level optimizer 632 is shown to include a peak load contribution module 914. Peak load contribution (PLC) is a customer's contribution to regional demand peaks that occur in geographic area managed by a regional transmission organization (RTO) or independent system operator (ISO) at certain hours within a base period. The regional demand at a given hour may be the summation of the customer's demand during (i.e., the rate at which the customer purchases electricity or another resource from a utility) as well as the demand of other buildings in the geographic area during that hour. The customer may be billed based on its contribution to the peak regional demand (e.g., $/kW of the customer's PLC) in addition to the energy consumption charges and demand charges previously described.

PLC module 914 can be configured to modify the cost function J(x) to account for a cost associated with the customer's PLC. By incorporating PLC costs into the cost function J(x), PLC module 914 enables high level optimizer 632 to allocate resource consumption and resource purchases to reduce the customer's PLC. High level optimizer 632 can reduce PLC costs by shifting the customer's load to non-peak times or shaving the customer's peak load. This can be done, for example, by precooling the building during non-peak times, using thermal energy storage, and/or using electrical energy storage such as a battery asset.

Accounting for the cost associated with the customer's PLC can be more difficult than accounting for energy consumption costs and demand charges. Unlike demand charge which is calculated based on the customer's maximum demand during predetermined demand charge periods, the hours over which PLC is calculated may not be known in advance. The hours of peak regional demand (i.e., the coincidental peak (CP) hours) may not be known until the end of the base period over which PLC is calculated. For example, the CP hours for a given base period (e.g., one year) may be determined by a RTO at the end of the base period based on the demand of all the buildings within the geographic area managed by the RTO during the base period (e.g., by selecting the hours with the highest regional demand). The customer's PLC may then be determined based on the customer's demand during the designated CP hours and used to calculate a cost of the customer's PLC. This cost may then be billed to the customer during the next time period (e.g., the next year), referred to as the billing period.

Another difficulty in accounting for PLC costs is that the base period, billing period, CP hours, and other factors used to calculate the PLC cost may differ from one RTO to another. For example, a RTO for the Pennsylvania, Jersey, and Maryland (PJM) geographic area may define the base period (i.e., the peak-setting period) as June $1^{st}$ of year Y to May $31^{st}$ of year Y+1. The billing period (i.e., the delivery period) may be defined as June $1^{st}$ of year Y+1 to May $31^{st}$ of year Y+2. PJM may define the CP hours as the five hours with the highest loads over the five highest peak load days across the PJM geographic region.

A customer's PLC in the PJM region may be calculated as the product of the customer's average electric load during the five CP hours and a capacity loss factor (CLF), as shown in the following equation:

$$PLC_{customer} = CLF \times \sum_{i=1}^{5} \frac{eLoad_{cp_i}}{5}$$

where $PLC_{customer}$ is the customer's peak load contribution calculated during year Y, CLF is the capacity loss factor (e.g., CLF=1.05), and $eLoad_{cp_i}$ is the customer's electric load (e.g., kW) during the ith CP hour.

The customer's PLC cost in the PJM region can be calculated as the product of the customer's PLC during year Y and a PLC rate, as shown in the following equation:

$$PLC_{cost} = r_{PLC} \times PLC_{customer}$$

where $PLC_{cost}$ is the customer's PLC charge billed over the delivery year Y+1 (e.g., $) and $r_{PLC}$ is the rate at which the customer is charged for its PLC (e.g., $/kW).

An additional complication in the PJM region relates to the interaction between PLC costs and economic load demand response (ELDR) revenue. In some embodiments, a customer participating in ELDR in the PJM region during one of the CP hours may be prohibited from reducing its PLC while earning ELDR revenue at the same time. Accordingly, a customer wishing to reduce its load during an assumed CP hour for the purpose of reducing its capacity, transmission, and/or demand charge costs may be restricted from making a bid for the same assumed CP hour in the ELDR market.

Another example of an organization which imposes PLC costs is the independent electricity system operator (IESO) in Ontario, Canada. Relative to PJM, IESO may use a different base period, billing period, CP hours, and other factors used to calculate the PLC cost. For example, IESO may define the base period or peak-setting period as May $1^{st}$ of year Y to April $30^{th}$ of year Y+1. The billing period or adjustment period for IESO may be defined as July $1^{st}$ of year Y+1 to June $30^{th}$ of year Y+2. IESO may define the CP hours as the five hours with the highest regional demands across the IESO geographic region.

At the end of the base period, IESO may calculate the customer's peak demand factor ($\theta_{PDF}$). The peak demand factor may be defined as the ratio of the sum of the customer's peak demand to the sum of the region-wide demand peaks during the five CP hours, as shown in the following equation:

$$\theta_{PDF} = \frac{\sum_{i=1}^{5} eLoad_{cp_i}}{\sum_{i=1}^{5} sysLoad_{cp_i}}$$

where $sysLoad_{cp_i}$ is the region-wide peak load during the ith CP hour and $eLoad_{cp_i}$ is the customer's peak load during the ith CP hour.

The customer's PLC cost in the IESO region is known as a global adjustment (GA) charge. The GA charge may be imposed as a monthly charge during the billing period. In some embodiments, the GA charge is calculated by multiplying the customer's peak demand factor by the monthly region-wide global adjustment costs, as shown in the following equation:

$$GA_{cost,month} = \theta_{PDF} \times GA_{total,month}$$

where $GA_{cost,month}$ is the customer's monthly PLC cost (e.g., $) and $GA_{total,month}$ is the region-wide global adjustment cost (e.g., $). The value of $GA_{total,month}$ may be specified by IESO. In some embodiments, $GA_{total,month}$ has a known value. In other embodiments, the value of $GA_{total,month}$ may not be known until the end of the base period.

In order to incorporate PLC costs into the cost function J(x) and allocate resource consumption/purchases in advance, PLC module 914 can generate or obtain a projection of the CP hours for an upcoming base period. The projected CP hours can then be used by high level optimizer 632 as an estimate of the actual CP hours. High level optimizer 632 can use the projected CP hours to allocate one or more assets (e.g., a battery, thermal energy storage, HVAC equipment, etc.) to minimize the customer's demand during the projected CP hours. These and other features of PLC module 914 are described in greater detail in U.S. patent application Ser. No. 15/405,234 filed Jan. 12, 2017, the entire disclosure of which is incorporated by reference herein.

Asset Sizing Incorporation

Still referring to FIG. 9, high level optimizer 632 is shown to include an asset sizing module 916. Asset sizing module 916 can be configured to determine the optimal sizes of various assets in a building, group of buildings, or a central plant. Assets can include individual pieces of equipment or groups of equipment. For example, assets can include boilers, chillers, heat recovery chillers, steam generators, electrical generators, thermal energy storage tanks, batteries, air handling units, or other types of equipment in a building or a central plant (e.g., HVAC equipment, BMS equipment, etc.). In some embodiments, assets include collections of equipment which form a subplant of a central plant (e.g., central plant 118). For example, assets can include heater subplant 521, chiller subplant 522, heat recovery chiller subplant 523, steam subplant 524, electricity subplant 525, or any other type of generator subplant 520. In some embodiments, assets include hot thermal energy storage 531 (e.g., one or more hot water storage tanks), cold thermal energy storage 532 (e.g., one or more cold thermal energy storage tanks), electrical energy storage 533 (e.g., one or more batteries), or any other type of storage subplant 530.

Asset sizes can include a maximum loading of the asset and/or a maximum capacity of the asset. Some assets such as storage subplants 530 may have both a maximum loading and a maximum capacity. For example, battery assets may have a maximum battery power (e.g., a maximum rate at which the battery can be charged or discharged) and a maximum state-of-charge (e.g., a maximum energy storage of the battery). Similarly, thermal energy storage assets may have a maximum charge/discharge rate and a maximum capacity (e.g., maximum fluid storage, etc.). Other assets such as generator subplants 520 may have only a maximum loading. For example, a chiller may have a maximum rate at which the chiller can produce cold thermal energy. Similarly, an electric generator may have a maximum rate at which the generator can produce electricity. Asset sizing module 916 can be configured to determine the maximum loading and/or the maximum capacity of an asset when determining the optimal size of the asset.

In some embodiments, asset sizing module 916 is implemented a component of planning tool 702. In the planning tool framework, asset sizing module 916 can determine the optimal size of an asset for a given application. For example, consider the planning problem described with reference to FIGS. 7-8 in which the high level optimization is solved at a given time instant k over a given time horizon h. With each iteration of the high level optimization, the time horizon h can be shifted forward by a block size equivalent to b time steps and the first b sets of decision variables may be retained. In such a planning problem, the sizes of the assets to be optimally allocated are typically given along with historical load data, utility pricing, and other relative data. However, there are many cases in which the sizes of the assets to be allocated are unknown. For example, when purchasing a new asset for a given application (e.g., adding thermal energy storage or electrical energy storage to a building or central plant), a user may wish to determine the optimal size of the asset to purchase.

Asset sizing module 916 can be configured to determine the optimal size of an asset by considering the potential benefits and costs of the asset. Potential benefits can include, for example, reduced energy costs, reduced demand charges, reduced PLC charges, and/or increased revenue from participating in IBDR programs such as frequency regulation (FR) or economic load demand response (ELDR). Potential costs can include fixed costs (e.g., an initial purchase cost of the asset) as well as marginal costs (e.g., ongoing costs of using the asset) over the time horizon. The potential benefits and costs of an asset may vary based on the application of the asset and/or the system in which the asset will be used. For example, a system that participates in FR programs may realize the benefit of increased IBDR revenue, whereas a system that does not participate in any IBDR programs may not realize such a benefit.

Some of the benefits and costs of an asset may be captured by the original cost function $J(x)$. For example, the cost function $J(x)$ may include terms corresponding to energy cost, multiple demand charges, PLC charges, and/or IBDR revenue, as previously described. Adding one or more new assets may affect the values of some or all of these terms in the original cost function $J(x)$. For example, adding a battery asset may increase IBDR revenue and decrease energy cost, demand charges, and PLC charges. However, the original cost function $J(x)$ may not account for the fixed and marginal costs resulting from new asset purchases. In order to account for these fixed and marginal costs, asset sizing module 916 may add new terms to the original cost function $J(x)$.

Asset sizing module 916 can be configured to augment the cost function $J(x)$ with two new terms that correspond to the cost of purchasing the new assets, resulting in an augmented cost function $J_\alpha(x)$. The additional terms are shown in the following equation:

$$J_\alpha(x) = J(x) + c_f^T v + c_s^T s_\alpha$$

where $J(x)$ is the original cost function, x is the vector of decision variables of the optimization problem over the horizon, $c_f$ is a vector of fixed costs of buying any size of asset (e.g., one element for each potential asset purchase), v is a vector of binary decision variables that indicate whether the corresponding assets are purchased, $c_s$ is a vector of marginal costs per unit of asset size (e.g., cost per unit loading, cost per unit capacity), and $s_\alpha$ is a vector of continuous decision variables corresponding to the asset sizes. Advantageously, the binary purchase decisions and asset size decisions are treated as decision variables which can be optimized along with the decision variables in the vector x. This allows high level optimizer 632 to perform a single optimization to determine optimal values for all of the decision variables in the augmented cost function $J_\alpha(x)$.

In some embodiments, asset sizing module 916 scales the asset purchase costs $c_f^T v$ and $c_s^T s_\alpha$ to the duration of the optimization period h. The cost of purchasing an asset is typically paid over an entire payback period SPP, whereas the operational cost is only over the optimization period h. In order to scale the asset purchase costs to the optimization period, asset sizing module 916 can multiply the terms $c_f^T v$ and $c_s^T s_\alpha$ by the ratio $$\frac{h}{SPP}$$

as shown in the following equation:

$$J_a(x) = J(x) + \frac{h}{8760 \cdot SPP}(c_f^T v + c_s^T s_a)$$

where h is the duration of the optimization period in hours, SPP is the duration of the payback period in years, and 8760 is the number of hours in a year.

High level optimizer 632 can perform an optimization process to determine the optimal values of each of the binary decision variables in the vector v and each of the continuous decision variables in the vector sa. In some embodiments, high level optimizer 632 uses linear programming (LP) or mixed integer linear programming (MILP) to optimize a financial metric such as net present value (NPV), simple payback period (SPP), or internal rate of return (IRR). Each element of the vectors $c_f$, v, $c_s$, and $s_\alpha$ may correspond to a particular asset and/or a particular asset size. Accordingly, high level optimizer 632 can determine the optimal assets to purchase and the optimal sizes to purchase by identifying the optimal values of the binary decision variables in the vector v and the continuous decision variables in the vector sa.

Subplant Curve Incorporation

Still referring to FIG. 9, high level optimizer 632 is shown to include a subplant curves module 930. In the simplest case, it can be assumed that the resource consumption of each subplant is a linear function of the thermal energy load produced by the subplant. However, this assumption may not be true for some subplant equipment, much less for an entire subplant. Subplant curves module 930 may be configured to modify the high level optimization problem to account for subplants that have a nonlinear relationship between resource consumption and load production.

Subplant curves module 930 is shown to include a subplant curve updater 932, a subplant curves database 934, a subplant curve linearizer 936, and a subplant curves incorporator 938. Subplant curve updater 932 may be configured to request subplant curves for each of subplants 520-530 from low level optimizer 634. Each subplant curve may indicate an amount of resource consumption by a particular subplant (e.g., electricity use measured in kW, water use measured in L/s, etc.) as a function of the subplant load.

In some embodiments, low level optimizer 634 generates the subplant curves by running the low level optimization process for various combinations of subplant loads and weather conditions to generate multiple data points. Low level optimizer 634 may fit a curve to the data points to generate the subplant curves and provide the subplant curves to subplant curve updater 832. In other embodiments, low level optimizer 634 provides the data points to subplant curve updater 932 and subplant curve updater 932 generates the subplant curves using the data points. Subplant curve updater 932 may store the subplant curves in subplant curves database 934 for use in the high level optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 618. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Subplant curve linearizer 936 may be configured to convert the subplant curves into convex curves. A convex curve is a curve for which a line connecting any two points on the curve is always above or along the curve (i.e., not below the curve). Convex curves may be advantageous for use in the high level optimization because they allow for an optimization process that is less computationally expensive relative to an optimization process that uses non-convex functions. Subplant curve linearizer 936 may be configured to break the subplant curves into piecewise linear segments that combine to form a piecewise-defined convex curve. Subplant curve linearizer 936 may store the linearized subplant curves in subplant curves database 934.

Subplant curve incorporator 938 may be configured to modify the high level optimization problem to incorporate the subplant curves into the optimization. In some embodiments, subplant curve incorporator 938 modifies the decision variables to include one or more decision vectors representing the resource consumption of each subplant. Subplant curve incorporator 938 may modify the inequality constraints to ensure that the proper amount of each resource is consumed to serve the predicted thermal energy loads. In some embodiments, subplant curve incorporator 938 formulates inequality constraints that force the resource usage for each resource in the epigraph of the corresponding linearized subplant curve. For example, chiller subplant 522 may have a linearized subplant curve that indicates the electricity use of chiller subplant 522 (i.e., input resource $in_1$) as a function of the cold water production of chiller subplant 522 (i.e., output resource $out_1$). The linearized subplant curve may include a first line segment connecting point $[u_1, Q_1]$ to point $[u_2, Q_2]$, a second line segment connecting point $[u_2, Q_2]$ to point $[u_3, Q_3]$, and a third line segment connecting point $[u_3, Q_3]$ to point $[u_4, Q_4]$.

Subplant curve incorporator 938 may formulate an inequality constraint for each piecewise segment of the subplant curve that constrains the value of the decision variable representing chiller electricity use to be greater than or equal to the amount of electricity use defined by the line segment for the corresponding value of the cold water production. Similar inequality constraints can be formulated for other subplant curves. For example, subplant curve incorporator 938 may generate a set of inequality constraints for the water consumption of chiller subplant 522 using the points defining the linearized subplant curve for the water consumption of chiller subplant 522 as a function of cold water production. In some embodiments, the water consumption of chiller subplant 522 is equal to the cold water production and the linearized subplant curve for water consumption includes a single line segment connecting point $[u_5, Q_5]$ to point $[u_6, Q_6]$. Subplant curve incorporator 938 may repeat this process for each subplant curve for chiller subplant 522 and for the other subplants of the central plant to define a set of inequality constraints for each subplant curve.

The inequality constraints generated by subplant curve incorporator 938 ensure that high level optimizer 632 keeps the resource consumption above all of the line segments of the corresponding subplant curve. In most situations, there is no reason for high level optimizer 632 to choose a resource consumption value that lies above the corresponding subplant curve due to the economic cost associated with resource consumption. High level optimizer 632 can therefore be expected to select resource consumption values that lie on the corresponding subplant curve rather than above it.

The exception to this general rule is heat recovery chiller subplant 523. The equality constraints for heat recovery chiller subplant 523 provide that heat recovery chiller subplant 523 produces hot water at a rate equal to the subplant's cold water production plus the subplant's electricity use. The inequality constraints generated by subplant curve incorporator 938 for heat recovery chiller subplant 523 allow high level optimizer 632 to overuse electricity to make more hot water without increasing the amount of cold water production. This behavior is extremely inefficient and only becomes a realistic possibility when the demand for hot water is high and cannot be met using more efficient techniques. However, this is not how heat recovery chiller subplant 523 actually operates.

To prevent high level optimizer 632 from overusing electricity, subplant curve incorporator 938 may check whether the calculated amount of electricity use (determined by the optimization algorithm) for heat recovery chiller subplant 523 is above the corresponding subplant curve. In some embodiments, the check is performed after each iteration of the optimization algorithm. If the calculated amount of electricity use for heat recovery chiller subplant 523 is above the subplant curve, subplant curve incorporator 938 may determine that high level optimizer 632 is overusing electricity. In response to a determination that high level optimizer 632 is overusing electricity, subplant curve incorporator 938 may constrain the production of heat recovery chiller subplant 523 at its current value and constrain the electricity use of subplant 523 to the corresponding value on the subplant curve. High level optimizer 632 may then rerun the optimization with the new equality constraints. These and other features of subplant curves module 930 are described in greater detail in U.S. patent application Ser. No. 14/634,609 filed Feb. 27, 2015, the entire disclosure of which is incorporated by reference herein.

Capacity Market Program (CMP) Optimization

Referring generally to FIGS. 10-15, systems and methods for optimizing the allocation of resources of a building for participation in a capacity market program (CMP) is shown, according to various exemplary embodiments. Incentive-Based Demand Response (IBDR) programs are programs offered by utility companies, Regional Transmission Organizations (RTO), and/or Independent System Operators (ISOs). Participation in these programs allows customers to generate revenue while minimizing their utility bill. Such programs are also of importance to the RTO, ISO, and/or utility companies since they lead to lower peak loads, which, consequently, helps maintain grid stability. The programs also help reduce the need for commissioning new power plants. IBDR programs may differ from one RTO, ISO and/or utility to another. For example, Pennsylvania, New Jersey, Maryland (PJM) offers an Economic Load Demand Response (ELDR) program where the customer can choose when to participate and the desired curtailment amount for specific hours. The customer is then compensated for the commitment at the real-time locational marginal prices of the market. California ISO (CAISO) offers a program similar to PJM's ELDR called Proxy Demand Resource (PDR).

Yet another type of programs offered by an RTO, ISO, and/or utility company is a capacity market program (CMP). Capacity market programs are voluntary demand response programs where a customer commits to be on stand-by to reduce energy consumption when dispatched by the relative authority. Choosing to commit to be on standby generates compensation for the customer. Furthermore, the customer, in such programs, is compensated for the actual energy reduction accomplished when dispatched. An exemplary program is the Capacity Bidding Program (CBP) offered by the Pacific Gas and Electric Company (PG&E). Details regarding the CBP program can be found in a publication titled "Electric Schedule E-CBP Capacity Bidding Program" published by the "Pacific Gas and Electric Company" on Feb. 20, 2018, the entirety of which is incorporated by reference herein.

Optimizing the performance of a Central Energy Facility (CEF) participating in a capacity market program presents more challenges than an IBDR program such as ELDR. The latter is due to the fact that the customer may receive a relatively short notice (e.g., one to three hours in advance) when an event is about to take place and the commitment to the capacity bid must be met. Systems and methods are described herein for optimizing the asset allocation of a CEF participating in a capacity market program, while minimizing underperformance of a customer when called upon. Furthermore, the systems and methods are configured to determine a nominated capacity, a promised amount of demand reduction, for a customer participating in a capacity market program. The nominated capacity may be an amount of kW curtailment agreed upon between the utility and the facility.

A capacity market program is a way for the RTO, ISO, and/or utility to insure the existence of a backup capacity that can be called upon when needed to maintain the grid stability and reliability. Customers can choose the operating period (e.g., a month, a particular season, a year, etc.) during which they want to be on stand-by and a nominated capacity bid they want to commit to at any time during said period. A customer may not be called-upon or dispatched at all during the operating period. In this case, the customer is paid for the insurance of being on stand-by for potential energy reduction. When a customer is dispatched during the operating period, the customer has to reduce the energy consumption by the nominated capacity amount. In the latter case, the customer is paid for the insurance of being on stand-by (capacity payment) and for the actual reduction in energy consumption (energy payment). An actual energy reduction by a customer is calculated by comparing the actual consumption of the customer during event hours to a customer specific energy baseline (CSEB). The customer is allowed to over-perform (reduce more than committed) without being penalized. However, underperformance (reducing less than committed) may result in penalties and a significantly reduced revenue.

As described herein, the PG&E capacity bidding program is used as an example of the systems and methods. However, the systems and methods discussed herein can be applied to various capacity market programs offered by other RTO, ISO and/or utilities. Penalty and payment structures may be different for other CMPs and the baseline may be different as well, but these differences translate into similar constraints on the optimization or additional terms to the cost function. As discussed herein systems and methods for integrating capacity market programs within a facility optimization framework is presented. Furthermore, systems and methods for determining the capacity bid for a facility participating in a capacity program is described for efficiently allocating the assets of a facility, while minimizing underperformance in order to avoid incurring any program penalties.

Figure 10:
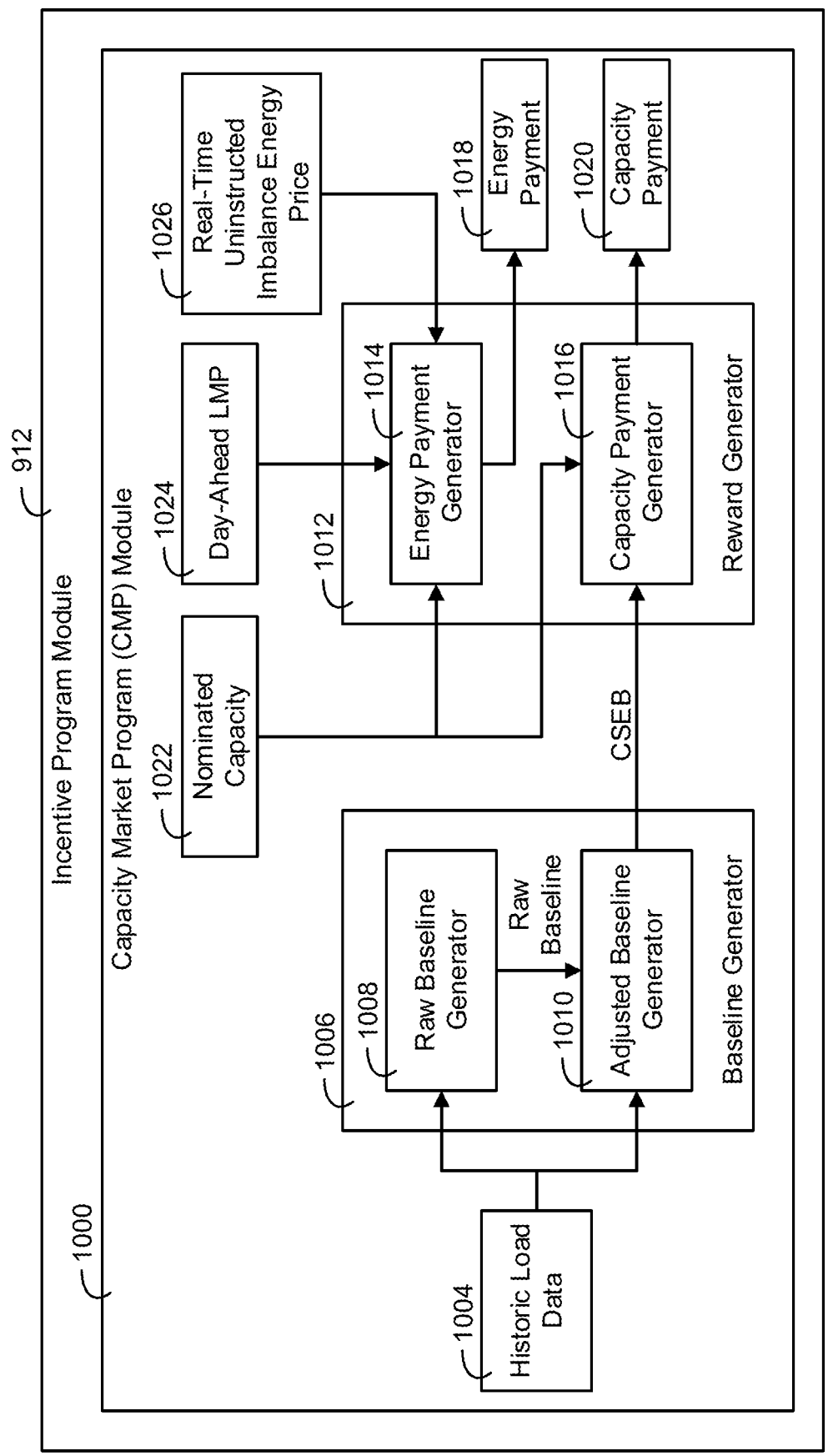
FIG. 10 is a block diagram of a capacity market program (CMP) module which can be implemented as a component of the controllers of FIGS. 6A-6B or the planning tool of FIG. 7 configured to determine a customer specific energy baseline (CSEB) and determine payments for participating in a CMP, according to an exemplary embodiment.

Referring now to FIG. 10, the incentive program module 912 is shown to include a capacity market program (CMP) module 1000 configured to participate in a CMP, according to an exemplary embodiment. The CMP module 1000 can be configured to generate a customer specific energy baseline (CSEB) and use the CSEB to generate energy payment amounts and capacity payment amounts. The CSEB may be indicative of a baseline load of campus 102 while the energy payment may be indicative of an amount of revenue generated based on committing to a nominated capacity and the capacity payment may be an amount of revenue generated based on fulfilling or exceeding the promise for the nominated capacity.

The CMP module 1000 is shown to include a baseline generator 1006. The baseline generator 1006 is shown to receive historic load data 1004 and generate a CSEB based on the historic load data 1004. The historic load data 1004 may be load values for multiple times of day or multiple days measured in the past via an energy meter. For example, the building management system 606 can include one or more power meters configured to measure data and generate the historic load data 1004. The CSEB may be used to establish a baseline load, an estimate of how much electricity the campus 102 would have used had it not reduced its use in response to a dispatch in the capacity bidding program. The CSEB can be compared against an actual load of the campus 102 during times the CMP module 1000 receives a market award or dispatch (e.g., a Demand Response Event), in order to calculate a Demand Response Energy Measurement. The dispatch may be a command or indication to reduce a load.

The baseline generator 1006 can be configured to generate a CSEB for the campus 102 for a particular day based on an average of loads for a past predefined amount of eligible days (e.g., for the past ten predefined eligible days). The average, also referred to as a raw baseline, can then be scaled based on a Load Point Adjustment (LPA). The baseline generator 1006 is shown to include a raw baseline generator 1008 and an adjusted baseline generator 1010. The raw baseline generator 1008 can be configured to generate the raw baseline and provide the raw baseline to the adjusted baseline generator 1010. The adjusted baseline generator 1010 can be configured to generate the CSEB based on the LPA and the raw baseline.

The raw baseline generator 1008 can be configured to select the 10 most recent weekdays that are non-event days (i.e., days on which the customer had not participated in CBP) and not holidays from the historic load data 1004. The set of days selected by the raw baseline generator 1008 can form a CSEB Basis Window denoted by a set D, where:

$$D = \{d_i\}$$
$$i = 1 \ldots 10$$

where $d_i$ is a vector of the hourly electric load for a day, such that:

$$d_i = [e_{i,1} \ldots e_{i,24}]$$

where $e_{i,j}$ is the electric load at the $j^{th}$ hour on the $i^{th}$ day. The raw customer baseline load can be the average of the 10 days:

$$e_{CSEBraw,I} = [e_{CSEBraw,I,1} \ldots e_{CSEBraw,I,24}]$$

where:

$$e_{CSEbraw,j} = \sum_{i=1}^{10} \frac{e_{i,j}}{10}$$

The adjusted baseline generator 1010 can be configured to multiply the raw baseline by the LPA as follows:

$$e_{CSEB,I} = \alpha_{LPA}[e_{CSEbraw,I,1} \ldots e_{CSEbraw,I,24}]$$

where the LPA is defined as:

$$\alpha_{LPA} = \max\left(\min\left(\frac{\sum_{k=m-4}^{m-2} e_{l,k}}{\sum_{k=m-4}^{m-2} e_{csebraw,l,k}}, 1.4\right), 0.6\right)$$

where $e_{l,k}$ is the electric load at the $k^{th}$ baseline adjustment hour and m is the first hour of participation or when an event is dispatched on the day for which the baseline is getting calculated.

The CMP module 1000 is shown to include a reward generator 1012 configured to generate reward rates at which the campus 102 is rewarded for participating in the CMP. The reward generator 1012 can be configured to generate the reward rates based on the CSEB generated by the baseline generator 1006. Furthermore, the reward generator 1012 can be configured to generate the reward rates based on a nominated capacity 1022, a day-ahead locational marginal price (LMP) 1024, and/or a real-time uninstructed imbalance energy price 1026. The reward generator 1012 is shown to include an energy payment generator 1014 configured to generate an energy payment rate 1018 and a capacity payment generator 1016 configured to generate the capacity payment rate 1020.

If a dispatch event (e.g., CBP event) is not called during an operating period (e.g., the number of Event Hours (EH), $N_{EH}$, is zero), the capacity payment generator 1016 can generate a capacity payment (CP) based on a capacity price $r_c$ and the nominated capacity 1022, i.e., $C_N$:

$$CP = r_c C_N \text{ such that } N_{EH} = 0$$

If at least one dispatch event is called during the operating period, the adjusted hourly $CP_i$ can be determined by the capacity payment generator 1016 a function of the nominated capacity 1022, the capacity price, number of event of hours in the operating period, the actual delivered capacity, and the ratio at which the customer is penalized for underperforming:

$$CP_i = a_c \times UCP - a_p \times UCP \text{ such that}$$

$$a_c = 0.5 \begin{cases} a_c = 1.05 & a_p = 0 & \alpha_{CR_i} \geq 1.05 \\ a_c = \alpha_{CR_i} & a_p = 0 & 0.75 \leq \alpha_{CR_i} < 1.05 \\ a_c = 0.5 & a_p = 0 & 0.6 \leq \alpha_{CR_i} < 0.75 \quad \forall i \in EventHours \\ a_c = 0 & a_p = 0.6 - \alpha_{CR_i} & 0 \leq \alpha_{CR_i} < 0.6 \\ a_c = 0 & a_p = 0.6 & \alpha_{CR_i} < 0 \end{cases}$$

where UCP is the unadjusted capacity payment calculated as shown below:

$$UCP = \frac{r_c C_N}{N_{EH}}$$

$e_{DC_i}$ is the hourly delivered capacity during event hours calculated as shown below:

$$e_{DC_i} = e_{CSEB,l,i} - e_{l,i}$$

where $e_{l,i}$ is the actual electric consumption during the $i^{th}$ hour on the $l^{th}$ day and $\alpha_{CR_i}$ is the hourly delivered capacity ratio, which is the ratio of the delivered capacity to the nominated capacity during the operating period.

$$\alpha_{CR_i} = \frac{e_{DC_i}}{C_N}$$

When at least one dispatch event is called during operating period, the campus 102 may be paid an energy payment 1018 in addition to the capacity payment 1020. The hourly energy payment 1018 may be determined by the energy payment generator 1014 by:

$$EP_i = r_{DA,i} C_N - r_{UIE,i}(C_N e_{DC_i})$$

where $r_{DA,i}$ is the Day-Ahead LMP 1024 and $r_{UIE,i}$ is the real-time uninstructed imbalance energy price 1026. If the customer reduces more energy than the nominated capacity, as shown in the Equation above, the additional curtailed energy is compensated at the real-time uninstructed imbalance energy price 1026. If the customer reduces less energy than the nominated capacity, then the revenue of the customer is reduced at the $r_{UIE,i}$ price for that hour.

Figure 11:
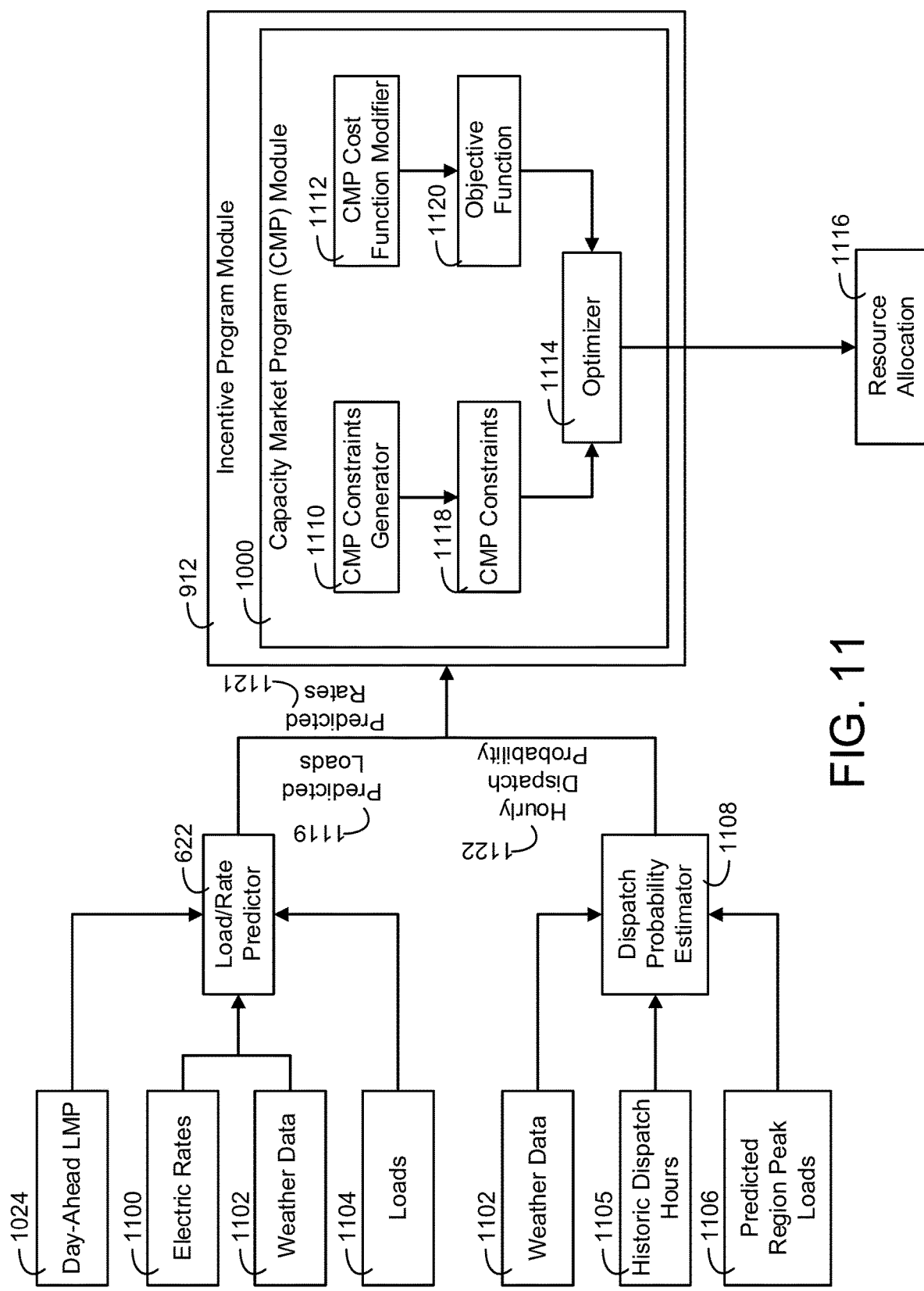
FIG. 11 is a block diagram of the CMP module of FIG. 10 performing an optimization of an objective function with constraints for either determining a nominated capacity or participating in the CMP based on the nominated capacity, according to an exemplary embodiment.

Referring now to FIG. 11, components of the CMP module 1000 are shown for generating a resource allocation 1116 and for participating in the CMP, according to an exemplary embodiment. The load/rate predictor 622, the dispatch probability estimator 1108, and/or the incentive program module 912 can be implemented on a computing system, e.g., processors and/or memory devices e.g., the energy storage controller 506 as described with reference to FIG. 6A, the controller 552 as described with reference to FIG. 6B, and/or the planning tool 702 as described with reference to FIG. 7. The resource allocation 1116 can be used to control one or more pieces of building equipment (e.g., batteries, generators, chillers, air handler units, etc.) to control environmental conditions of the campus 102. The CMP module 1000 can be configured to efficiently allocate the assets (e.g., determine resource allocations) within the campus 102 in order to respond to a dispatch from the capacity market. The CMP module 1000 can be configured to generate the resource allocation 1116 such that the amount by which the campus 102 underperforms (e.g., fails to meet its promised nominated capacity) is minimized since underperformance would result in a reduced revenue due to incurred penalties. The resource allocation 1116 can be generated with an objective function and one or more constraints, both of which are described in greater detail below. The constraints can cause the optimization by the CMP module 1000 to reduce a load of the campus 102 by a nominated capacity value and/or by an amount greater than the nominated capacity value.

Given the nominated capacity 1022 and energy payments 1018 and 1020 described with reference to FIG. 10, an objective function 1120 (e.g., a cost function indicating the cost of operating building equipment and participating in various IBDR programs including a CMP) that can be minimized can be updated with the payment terms corresponding to the capacity market program. The CMP module 1000 is shown to include a CMP cost function modifier 1112. The CMP cost function modifier 1112 can be configured to generate or modify the objective function 1120 to account for terms associated with the CMP market. For example, the terms can be energy terms accounting for revenue lost by not reducing a load of the campus 102 by a nominated capacity amount. Furthermore, the terms can account for revenue gained by reducing the load by the nominated capacity or by the nominated capacity amount or by an amount greater than the nominated capacity. In some embodiments, the energy terms are implemented in the objective function as adjustments to an energy rate of the objective function. The adjustment to the energy rate can vary based on time. For example, the adjustment can cause the energy rate to be a first level during a dispatch hour, and a second level, less than the first level, during a baseline hour.

The objective function 1120 can be the same and/or similar to the objective function described elsewhere herein. In some embodiments, the objective function 1120 includes terms for other programs e.g., frequency response, ELDR, etc. In this regard, the CMP cost function modifier 1112 can be configured to modify the objective function 1120 to account for the CMP terms in addition to the already present terms for other programs. Furthermore, the terms of the objective function 1120 may correspond to resources e.g., heating and/or cooling resources, lighting equipment, etc.

The CMP cost function modifier 1112 can be configured to generate the objective function 1120 and the CMP constraints generator 1110 can be configured to generate the CMP constraints 1118 such that the CMP module 1000 can facilitate participation in the CMP market. The first four terms of the objective function 1120 shown below are the revenues and penalties generated over a given horizon of length h from participating in the CMP market. Furthermore, the objective function 1120 shown below indicates the cost of purchased electricity:

$$J = \ldots - \sum_{i=k}^{k+h-1} p_i \frac{r_c C_N}{N_{EH}} f_R(\alpha_{CR_i}) + \sum_{i=k}^{k+h-1} p_i \frac{r_c C_N}{N_{EH}} f_P(\alpha_{CR_i}) - \sum_{i=k}^{k+h-1} p_i r_{DA,i} C_N + \sum_{i=k}^{k+h-1} p_i r_{UIE_i}(C_N - (e_{CSEB,l,i} - e_{l,i})) + \sum_{i=k}^{k+h-1} r_{e_i} e_{l,i} + \ldots$$

where $e_{l,i}$ is the electric consumption at the $i^{th}$ hour over the horizon, Os the energy rate, which can be either constant, Real-Time Pricing (RTP), or Time-Of-Use (TOU), $p_i$ is a mask, which has a value of 1 when an hour is dispatched and 0 when an hour is not dispatched, $f_R(\alpha_{CR_i})$ is the hourly revenue adjustment ratio multiplying the unadjusted capacity payment and it is a piece-wise function of the hourly delivered capacity ratio as shown below and shown in FIG. 14. $f_P(\alpha_{CP_i})$ is the hourly penalty adjustment ratio multiplying the unadjusted capacity payment and it is a piece-wise function of the hourly delivered capacity ratio as shown in the equation below and in FIG. 15.

$$f_R(\alpha_{CR_i}) = \begin{cases} 1.05 & \alpha_{CR_i} \geq 1.05 \\ \alpha_{CR_i} & 0.75 \leq \alpha_{CR_i} < 1.05 \\ 0.5 & 0.6 \leq \alpha_{CR_i} < 0.75 \\ 0 & \text{otherwise} \end{cases}$$

$$f_P(\alpha_{CR_i}) = \begin{cases} 0.6 - \alpha_{CR_i} & 0 \leq \alpha_{CR_i} < 0.6 \\ 0.6 & \alpha_{CR_i} < 0 \\ 0 & \text{otherwise} \end{cases}$$

The energy term, $$\sum_{i=k}^{k+h-1} p_i \frac{r_c C_N}{N_{EH}} f_R(\alpha_{CR_i}),$$

of the above objective function can account for revenue generated by reducing the load of the facility by the nominated capacity value or by a value greater than the nominated capacity value. More specifically, an energy rate can be adjusted based on compensation rate for reducing the load of the facility by the nominated capacity value or by a value greater than the nominated capacity value. The electric rate adjustment, $f_R(\alpha_{CR_i})$, is an adjustment to the energy rate of the objective function. The value of the electric rate adjustment may be a sum of energy rates of the campus 102 of dispatched hours.

The objective function 1120 with the terms added by the CMP cost function modifier 1112 for the capacity market program may be nonlinear. In this regard, the optimizer 1114 can linearize the objective function 1120 by making various assumptions. The optimizer 1114 can optimize the linearized objective function 1120 via Mixed-Integer Linear Programming or Linear Programming.

Since in an operational framework, the nominated capacity 1022, $C_N$, is known and constant, the term $-\Sigma_{i=k}^{k+h-1} p_i r_{DA,i} C_N$ can be removed from the objective function 1120. Furthermore, the capacity prices over a given period are usually high and can vary between 3,000 to 22,000 $/MWh, which are relatively very high when compared to revenue from other IBDR programs. Also, examining $f_R(\alpha_{CR_i})$ and $f_P(\alpha_{CR_i})$, it can be observed that if the delivered capacity is constrained to 1.05 $C_N$, then the need for a penalty term in the cost function is no longer necessary.

The CMP constraints 1118 may include various equality and/or inequality constraints. However, a hard constraint may result in an infeasibility problem under circumstances where it cannot achieve the desired threshold. Therefore, the aforementioned hard constraint can be implemented as a soft constraint by adding an hourly auxiliary variable $s_i$ corresponding to a penalty term in the cost function. The penalty term may be a participation compensation rate based on a probability of being dispatched by a utility. Optimization with soft constraints may allow for violation of the constraints. The optimizer 1114 can be configured to determine whether or not it is possible to reduce the load of the facility by the nominated capacity value. In response to a determination that the nominated capacity value cannot be met by the facility, the optimizer 1114 can be configured to break the soft constraints.

The objective function 1120 can be modified by the CMP cost function modifier 1112 to be:

$$J = \ldots - \sum_{i=k}^{k+h-1} p_i r_{UIE_i}(e_{CSEB,l,i} - e_{l,i}) + \sum_{i=k}^{k+h-1} r_{e_i} e_{l,i} + \sum_{i=k}^{k+h-1} q_i \beta_i s_i + \ldots$$

where inequality constraints of the CMP constraints 1118 are:

$s_i > 1.05 C_N - (e_{CSEB,l,i} - e_{l,i})$ $s_i > 0.6 C_N - (e_{CSEB,l,i} - e_{l,i})$ where $\beta_i$ is the penalty cost, which is a tunable parameter and can be determined based on the capacity price and a projected total number of dispatch hours. $q_i$ is the probability of getting dispatched (e.g., the hourly dispatch probability 1122). If, for a given hour, the campus 102 is dispatched to meet the nominated capacity 1022, then $q_i$ has a value of 1. If, for a given hour, it is known know that that the campus 102 is not getting dispatched, then $q_i$ has a value of 0. If the actual status of an hour is unknown, then $q_i$ is a calculated probability based on factors such as weather, time-of-day, day-of-week, Day-Ahead LMP, region Peak Loads, etc. In FIG. 11, the hourly dispatch probability 1122, i.e., $q_i$, is shown to be generated by a dispatch probability estimator 1108. The dispatch probability estimator 1108 can be configured to generate the hourly dispatch probability 1122 based on historic weather data and/or weather schedules (weather data 1102), historic dispatch hours 1105, and/or predicted region peak loads 1106.

A higher probability can drive the optimization to try to meet the CMP constraints 1118 shown above and a lower probability can drive the optimization of the optimizer 1114 to try to meet the constraints at a lower cost. Thus, in some embodiments, the constraints used to optimize the objective function 1120 are based on the probability 1122, i.e., the values of the constraints may be based on the probabilities of receiving a dispatch for a particular time.

Finally, given the calculation of the CSEB described with reference to FIG. 10, the objective function 1120 can be rearranged by the CMP cost function modifier 1112 to be:

$$J = \ldots + \sum_{i=k}^{k+h-1} (r_{e_i} + \alpha_{r,i}) e_{l,i} + \sum_{i=k}^{k+h-1} q_i \beta_i s_i + \ldots$$

with the CMP constraints 1118:

$s_i > 1.05 C_N - (e_{CSEB,l,i} - e_{l,i})$ $s_i > 0.6 C_N - (e_{CSEB,l,i} - e_{l,i})$ where $\alpha_i = f(-r_{UIE,i}, e_{casebraw,l,i}) < 0 \, \forall i \in$ CSEB hours/ $j \in$ Dispatched hours $\alpha_i = r_{UIE,i} \, \forall i \in$ Dispatched hours $\alpha_i = 0$ otherwise Further simplification of the above problem can be implemented by assuming that the load point adjustment $a_{LP4}$ is independent of the raw CSEB and has an estimated value calculated as:

$$\alpha_{LP4}: \max\left(\min\left(\frac{\sum_{k=m-4}^{m-2} e_{l,k}}{3}, 1.4\right), 0.6\right)$$

The above assumption yields the following modified adjustment to the electric energy rates:

$$\alpha_i = f\left(-\sum_j \frac{r_{UIE_j}}{3}\right) < 0 \, \forall \, i \in CSEB \text{ hours}/ j \in \text{Dispatched hours}$$

$a_i = r_{UIE_i} \, \forall \, i \in$ Dispatched hours $a_i = 0$ otherwise

Figure 12A:
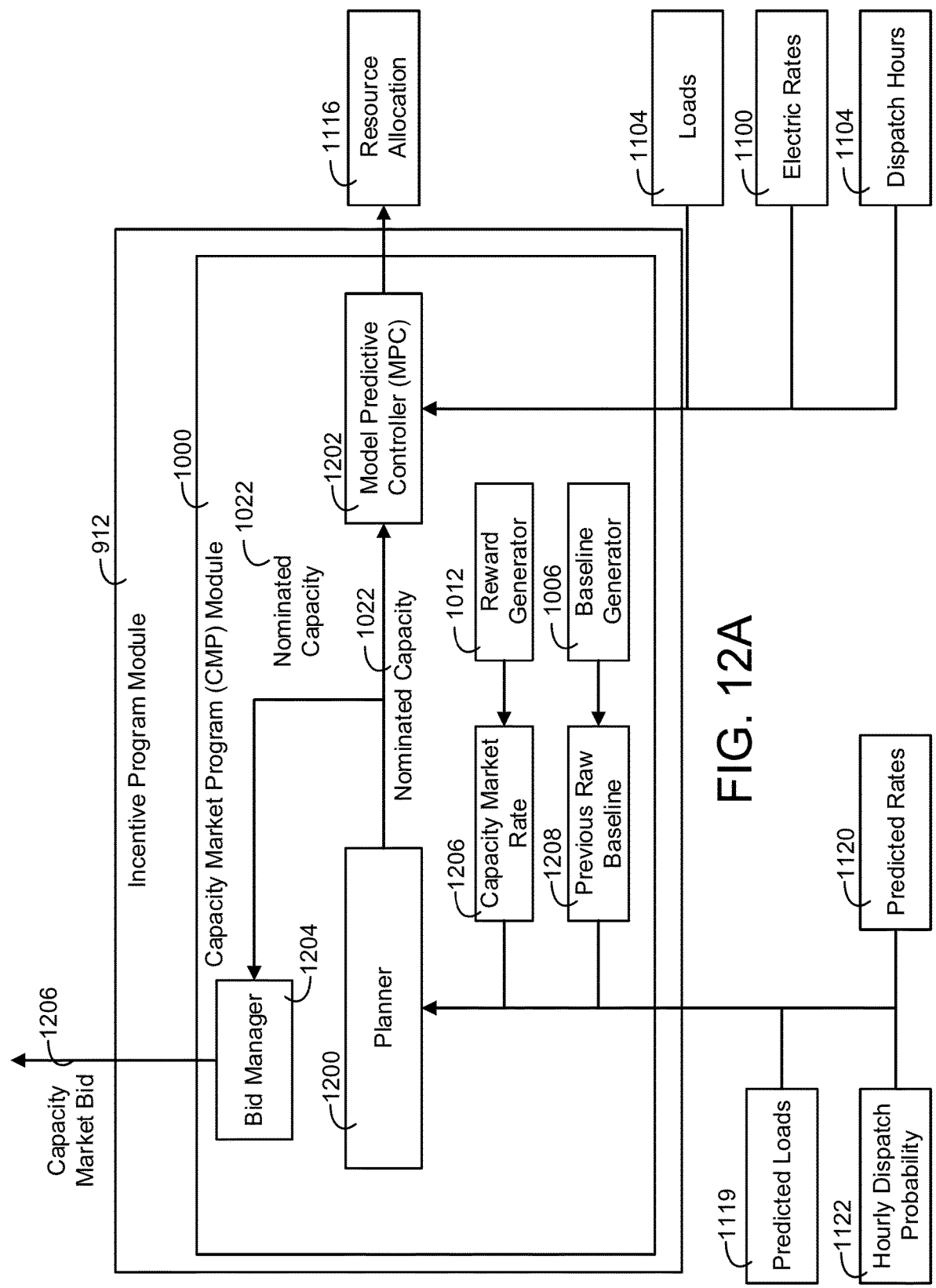
FIG. 12A is a block diagram of the CMP module of FIG. 10 shown to include a planner for determining the nominated capacity and a model predictive controller (MPC) for participating in the CMP based on the determined nominated capacity, according to an exemplary embodiment.

Referring now to FIG. 12A, the CMP module 1000 is shown in greater detail to include a planner 1200 and a model predictive controller (MPC) 1202 for generating resource allocation 1116, according to an exemplary embodiment. The planner 1200 can be configured to generate the nominated capacity 1022. The bid manager 1204 can generate a capacity market bid 1206 based on the nominated capacity 1022. Furthermore, the MPC 1202 can be configured to generate the resource allocation 1116 based on the nominated capacity 1022.

The planner 1200 is shown to generate the nominated capacity 1022 based on a capacity market rate 1206 determined by the reward generator 1012, a previous raw baseline 1208 generated by the baseline generator 1006, the predicted loads 1119, the hourly dispatch probability 1122, and/or the predicted rates 1121. Inputs to the planner 1200 may be predicted values and/or historical data. The MPC 1202 is shown to generate the resource allocation 1116 based on the nominated capacity 1022, loads 1104, electric rates 1100, and/or dispatch hours 1105. The electric rates 1100 and the dispatch hours 1105 may be actual values received from a utility. The loads 1104 may be an actual and/or predicted load of the campus 102.

The CMP module 1000 can be configured to control the campus 102 to participate in a CMP if the campus 102 is located is in a geographic area within which CMP exists. The CMP module 1000 can be configured to enter the campus 102 into a capacity market program at the beginning of a pre-specified period, which can be an annual period, a monthly period, or a seasonal period. The campus 102 may be paid for its insurance that, if dispatched, the campus 102 will reduce its electrical load by the nominated capacity 1022.

In FIG. 12A, just before the beginning of a pre-specified period (e.g., a month), a longer term optimization problem can be run by the planner 1200, where the length of the planning period can be that of the applicable program period. The planner 1200 can be configured to generate the objective function 1120 and the CMP constraints 1118 based on the configuration of the campus 102. In addition to the decision variables based on the configuration, the planner 1200 can be configured to add another decision variable to the objective function 1120. This decision variable may represent the amount of the nominated capacity 1022.

A set of constraints, e.g., the CMP constraints 1118 can also added to the optimization problem that guarantee that the nominated capacity 1022 can be curtailed during any predicted or input dispatch hours while still meeting all facility loads in a cost efficient manner. The optimization problem is solved by the planner 1200 to obtain the nominated capacity bid (e.g., the nominated capacity 1022).

In some embodiments, the bid manager 1204 generates the capacity market bid 1206 which may include the nominated capacity bid. The bid manager 1204 can be configured to provide the capacity market bid 1206 to a utility for consideration in the capacity program. In some embodiments, the planner 1200 can be configured to provide the nominated capacity 1022 to the MPC 1202 for implementation of the prescribed curtailment for dispatch hours during the operating period. Furthermore, the planner 1200 and/or the MPC 1202 can be configured to generate other load allocations for the campus 102, e.g., load allocations for all the equipment in the campus 102.

For a given customer, the ideal value of the nominated capacity 1022 may depend on the CEF layout and loads. Therefore, the CMP module 1000 can be configured to determine the nominated capacity for a facility participating in the capacity market program. This can be done via the planner 1200, where the nominated capacity 1022 can be determined prior to the operating period. The resulting $C_N$ value can then submitted to the RTO/ISO or utility before the operating period starts via the bid manager 1204.

The determined $C_N$ value can serve as an input to the operational cost optimization framework which controls the facility in real-time and allocates assets. This framework may be implemented by the MPC 1202. The MPC 1202 can be configured to iteratively generate the resource allocation 1116. For example, the MPC 1202 can be configured to generate the resource allocation 1116 for a particular week into the future (a one week horizon) periodically (e.g., every fifteen minutes). Generate the resource allocation 1116 is further described in FIG. 11. The MPC 1202 can be configured to generate the resource allocation 1116 based on the optimization described with reference to FIG. 11.

The planner 1200 can be configured to add $C_N$ as a decision variable to the objective function 1120 along with the associated capacity and energy payment terms described with reference to FIG. 11. Since, a customer can be paid at the capacity price even when there are not any dispatched hours or events during the operating period, the term $-w_{r_c} r_c C_N$ can be added to the objective function 1120. The planning period in this case should be the same as the operating period of the program, for example, a month, a season, and/or a year. For the given planning period, the optimization problem with the following objective function 1120 and additional constraints can be solved iteratively for the span of the planning period by the planner 1200.

$$J = \ldots + \left( -w_{r_c} r_c + \sum_{i=k}^{k+h-1} (\hat{r}_{DA,i} - \hat{r}_{UIE,i}) \right) C_N - \sum_i \hat{p}_i \hat{r}_{UIE_i} (\hat{e}_{CSEB,l,i} - e_{l,i}) +$$

$$\sum_{i=k}^{k+h-1} r_{e_i} e_{l,i} + \ldots \quad \hat{p}_i (\hat{e}_{CSEB,l,i} - e_{l,i}) > \hat{p}_i C_N$$

where $w_{r_c}$ is the weight of the capacity price, which allows for prorating the capacity price to the optimization period such that:

$$w_{r_c} = h / L_p$$

where $L_p$ is the length of the planning period (a program operating period of the CMP) in hours.

The cost function shown above can be rewritten as shown below, where the estimated dispatch hours result in an adjustment of the electricity rates.

$$J = \ldots \left( -w_{r_c} r_c + \sum_{i=k}^{k+h-1} (\hat{r}_{DA,i} - \hat{r}_{UIE,i}) \right) C_N \ldots - \sum_{i=k}^{k+h-1} (r_{e_i} + \hat{a}_i) e_{l,i} + \ldots$$

$$a_i = f(-\hat{r}_{UIE,j}, e_{casebraw,l,j}, e_{casebraw,l,i}) <$$

$$0 \; \forall \; i \in CSEB \text{ hours}/j \in \text{Dispatched hours}$$

$$a_i = \hat{r}_{UIE,i} \; \forall \; i \in \text{Dispatched hours}$$

$$a_i = 0 \text{ otherwise}$$

With reference to the above equation, the nominated capacity 1022, $C_N$, can be a decision variable of the objective function. As can be seen, the nominated capacity 1022 is multiplied by a weighting term, in the above equation, $w_{r_c}$. The weighting term can account for an optimization horizon, e.g., h, the time horizon over which the nominated capacity value is optimized, being less than the program operating period $L_p$, the entire period over which the CMP requires a bid of the nominated capacity value to be made. For example, if the program operating period is an entire month while the optimization horizon is only a week, the weighting term can take into account the difference in time periods.

Figure 12B:
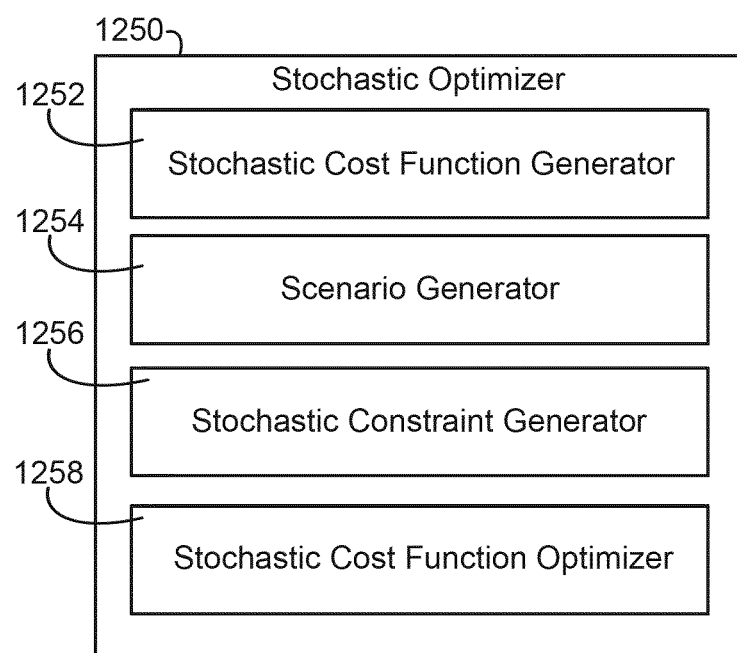
FIG. 12B is a detailed block diagram of a stochastic optimizer of the CMP module of FIG. 12A, according to an exemplary embodiment.

Referring now to FIG. 12B, a detailed view of a stochastic optimizer 1250 is shown, according to an exemplary embodiment. The stochastic optimizer 1250 is configured to determine an optimal allocation of energy loads across equipment for a building or campus over a prediction horizon by performing a stochastic optimization process. The operations that the stochastic optimizer 1250 can be the same as, or similar to, the optimizations described with reference to U.S. patent application Ser. No. 15/963,891 filed Apr. 26, 2018, the entirety of which is incorporated by reference herein. In some embodiments, the planner 1200 as described with reference to FIG. 12A is configured to perform a stochastic optimization with the stochastic optimizer 1250 to determine the nominated capacity 1022 to provide as the capacity market bid 1206 to a utility system. Furthermore, in some embodiments, the MPC 1202 can be configured to perform a stochastic optimization for participating in the CMP by using the stochastic optimizer 1250.

The stochastic optimizer 1250 includes a stochastic cost function generator 1252, a scenario generator 1254, a stochastic constraint generator 1256, and a cost function optimizer 1258. The stochastic cost function generator 1252 can be the same as, or similar to, the CMP cost function modifier 1112, and/or can include some or all of the operations of the CMP cost function modifier 1112. Furthermore, the stochastic constraint generator 1256 can be the same as, or similar to, the CMP constraints generator 1110, and/or can include some or all of the operations of the CMP constraints generator 1110. Furthermore, the cost function optimizer 1258 can be the same as, or similar to, the optimizer 1114, and/or can include some or all of the operations of the optimizer 1114.

The stochastic optimizer 1250 is configured to generate a cost function that captures the costs (i.e., monetary charges) of energy consumption of a building or campus, e.g., the campus 102 (e.g., the objective function 1120). The cost function considers the price(s) of input resources purchased from utility companies and incentives offered by utility companies for participation in supplier-provided programs such as CMP, frequency response, and/or economic load demand response. The cost of purchasing the input resources includes one or more demand charges. The cost function is dependent on the prices of input resources and the value of incentives offered by utility companies and load demands on the equipment from the building or campus, both of which vary over time.

The scenario generator 1254 is configured to generate potential scenarios, each scenario including predicted load (i.e., demand of resources) required by a building or campus and predicted prices for the input resources for each of a plurality of time steps. In some embodiments, the scenario generator 1254 predicts resource consumption of the building or campus at each time step up to a prediction horizon and identifies an uncertainty range of the predicted resource consumption. The scenario generator 1254 then generates a first potential scenario by selecting a first set of resource consumption values within the uncertainty range and generates one or more additional potential scenarios by selecting one or more additional sets of energy consumption values within the uncertainty range. The scenario generator 1254 also predicts prices of input resources for each of a plurality of time steps up to the prediction horizon and uses a similar stochastic method to associate each set of resource consumption values with a corresponding set of resource price predictions. The scenario generator 1254 thereby generates numerous potential scenarios that include load trajectories over time as well as prices of input resources over that same time.

The stochastic constraint generator 1256 is configured to generate constraints (e.g., the CMP constraints) based on physical, regulatory, business, or other limits on the behavior of the equipment and utility companies that may be applied to the cost function. One constraint may be a resource balance constraint that requires balance between a total amount of each resource supplied and a total amount of each resource consumed. In some embodiments, the resource balance constraint also considers storage of resources, such that the resource balance constraint requires balance between a total amount of each resource supplied or moved out of storage and a total amount of each resource consumed or moved into storage. Another constraint may require that the allocation for a first time step is the same for each scenario.

Other constraints may relate to limits on the rates of charging and discharging of batteries or other storage equipment, the rate of resource consumption/production of the equipment, limits on the possibility of selling resources back to utility companies, and/or other possibilities. The stochastic constraint generator 1256 is configured to receive data from various equipment and/or a database of system parameters/data to generate the constraints, in some embodiments. In some embodiments, the constraints may be based on each potential scenario, such that each potential scenario has corresponding constraints. In some embodiments, the constraints are based on the system and associated requirements.

The stochastic cost function optimizer 1258 is configured to solve an optimization problem to determine the optimal allocation of energy loads across the equipment, in some embodiments. The stochastic cost function optimizer 1258 is configured to create an overall cost function by calculating a weighted sum of individual cost functions for each potential scenario subject to one or more constraints (e.g., the resource balance constraint) for each scenario. The individual cost functions for each potential scenario are weighted in the sum based on the probability of that scenario occurring (i.e., the probability of the predicted loads and/or predicted prices occurring). The stochastic cost function optimizer 1258 is configured to optimize the overall cost function by determining an optimal allocation of resource loads that minimizes the overall cost function, in some embodiments.

In some embodiments, the stochastic cost function optimizer 1258 optimizes the cost function to determine optimal energy allocation for each of the plurality of time steps in an optimization period, where the optimization period corresponds to a portion of a planning period. The stochastic cost function optimizer 1258 may then shift the optimization period forward in time by a block size of a predetermined number of time steps. The stochastic cost function optimizer 1258 may iteratively repeat the optimizing and shifting steps until the cost function has been optimized for each time step that occurs during the planning period. The stochastic cost function optimizer 1258 is configured to predict the cost of operating the facility over the planning period based on the optimal values of the energy allocations for each time step that occurs during the planning period, in some embodiments. In some embodiments, the stochastic cost function optimizer 1258 is configured to predict the cost of operating the facility over the planning period by running one or more scenarios and calculating a weighted average of the scenarios. The stochastic optimizer 1250 thereby generates an optimal allocation of resource loads. The stochastic optimizer 1250 may then use the optimal allocation of resource loads to generate controls for equipment to control the equipment to achieve the optimal allocation of resource loads. The stochastic optimizer 1250 thereby minimizes the utility costs of operating the building or campus.

In some embodiments, the scenario generator 1254 is configured to generate multiple different scenarios where each scenario is based on various particular load amounts, various particular rate amounts, and/or one or more particular dispatch hours specific to the CMP, i.e., whether or not a request to perform load reduction according to the CMP will be received. Based on the various scenarios, the stochastic cost function generator 1252 can be configured to generate multiple different cost functions. Each of the cost functions generated by the stochastic cost function generator 1252 can be for one of the scenarios for participating in the CMP generated by the scenario generator 1254.

In some embodiments, the stochastic cost function generator 1252 is configured to sum each of the cost functions and a variable for the optimal nominated capacity value. In some embodiments the sum of the cost functions is a weighted sum. The sum may be weighted based on a probability of receiving the dispatch during each of the plurality of scenarios. In some embodiments, the probability is the hourly dispatch probability 1122 generated by the dispatch probability estimator 1108. Furthermore, each of the scenarios can be weighted based on another probability, a probability that the scenario will occur. In this regard, the most likely to occur scenarios can receive a greater weight while the least likely to occur scenarios can receive less weight.

Based on the summed cost function, the stochastic cost function optimizer 1258 can be configured to optimize the summed the objective function with one or more constraints, e.g., the CMP constraints 1118 and/or the constrains for each scenario. In some embodiments, the one or more constraints cause the curtailment value to be at least the optimal nominated capacity value for each scenario of the plurality of scenarios where the dispatch is received from the utility. In some embodiments, the one or more constraints include other constraints, e.g., charging constraints. For example, these constraints could cause a state of charge of a storage device of the facility to be the same at the beginning and end of each of the plurality of scenarios.

As an example, the MPC 1202 can be configured to perform a stochastic optimization to determine resource allocation. The scenario generator 1254 is configured to generate one or more scenarios for participation in the CMP program, for example, scenarios for times after a CMP bid has been submitted for participation in the CMP program and the MPC 1202 has, or will, receive dispatches for reducing resource allocation according to a nominated capacity value submitted in the bid. The scenario generator 1254 can generate one or more scenarios (e.g., different possible load amounts, different possible utility rate amounts, one or more possible CMP dispatch hours), etc. In some embodiments, the scenarios include actual dispatched hours but also possible future dispatch hours. Therefore, the optimization can take into account only possible future dispatch hours, only actual received dispatch hours, or a combination of both possible future dispatch hours and actual received dispatch hours. In the event that an actual dispatch hour has been received by the MPC 1202, the scenario generator 1254 may generate each scenario to include the received actual dispatch hour.

Based on the different scenarios generated, the stochastic cost function generator 1252 can be configured to generate a cost function for each scenario and sum the cost functions together. According to one or multiple different constraints for participating in the CMP program, the stochastic cost function optimizer 1258 can be configured to optimize the summed cost function to determine the resource allocation. In some embodiments, the optimization is performed such that the resource allocation causes a load of the facility to be reduced by at least the nominated capacity value for each of the scenarios.

Figure 13:
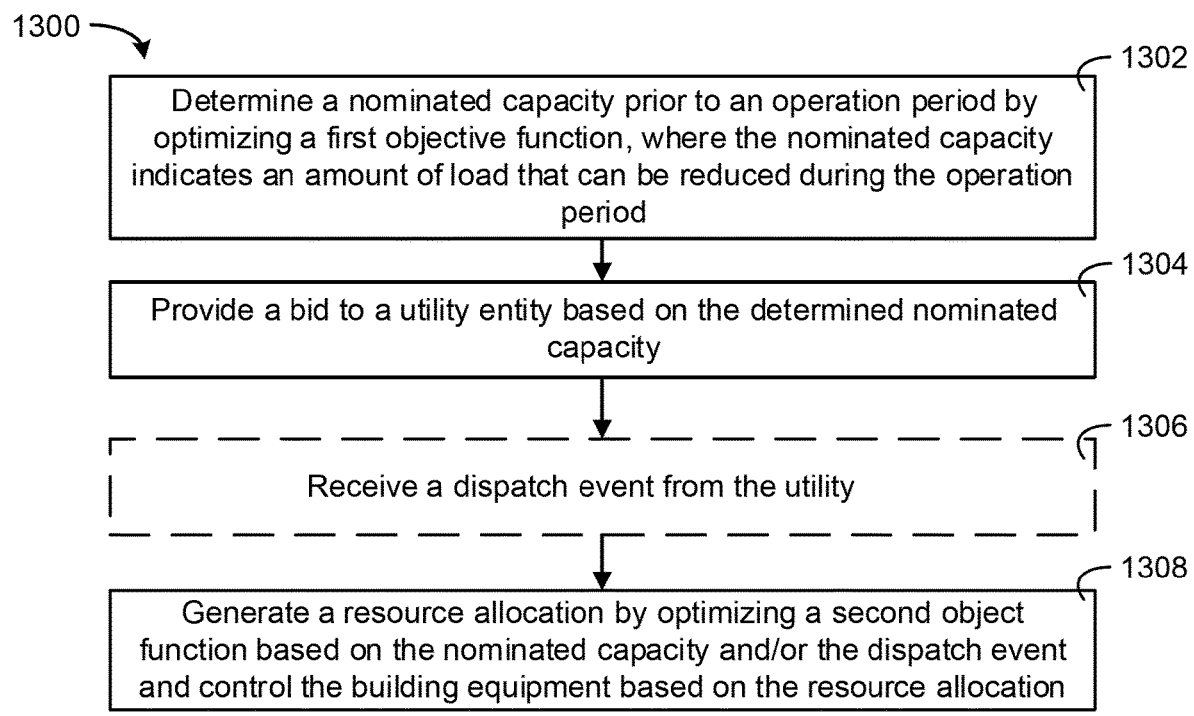
FIG. 13 is a process that can be performed by the CMP module of FIG. 10 for determining the nominated capacity and participating in the CMP based on the determined nominated capacity, according to an exemplary embodiment.

Referring now to FIG. 13, a process 1300 is shown for participating in a capacity market program, according to an exemplary embodiment. The controller 552 and/or the planning tool 702 can be configured to perform the process 1300. The CMP module 1000 can be configured to perform the process 1300. Furthermore, the CMP module 1000 is described with reference to the CMP module 1000. However, any computing device or computing component described herein can be configured to perform the process 1300.

In step 1302, the CMP module 1000 can determine the nominated capacity 1022 prior to an operation period. The operation period may be a period at which the CMP module 1000 is committed to reducing a load based on the nominated capacity 1022 if dispatched. The nominated capacity 1022 may indicate an amount which the CMP module 1000 commits to being able to reduce by in response to being commanded to by a utility.

The CMP module 1000 can optimize an objective function:

$$J = \ldots + \left(-w_{r_c} r_c + \sum_{i=k}^{k+h-1} (\hat{r}_{DA,i} - \hat{r}_{UIE,i})\right) C_N \ldots - \sum_{i=k}^{k+h-1} (r_{e_i} + \hat{a}_i) e_{l,i} + \ldots$$

in order to generate the nominated capacity based on the adjusted rates:

$$\alpha_i = f(-\hat{r}_{UIE,i}, e_{casebraw,I,j}, e_{casebraw,I,i}) < 0 \ \forall i \in \text{CSEB hours}/j \in \text{Dispatched hours}$$

$$\alpha_i = \hat{r}_{UIE,i} \ \forall i \in \text{Dispatched hours}$$

$$\alpha_i = 0 \ \text{otherwise}$$

In some embodiments, the CMP module 1000 optimizes the objective function with various constraints. In some embodiments, the constraints cause the nominated capacity determined based on the objective function to be a value that is feasible for the campus 102 to reduce its load by. Furthermore, in some embodiments, the constraints are based on a raw baseline (e.g., the CSEB as described with reference to FIG. 10) allowing the optimization to take into account at typical load of the facility.

In some embodiments, the CMP module 1000 estimates the baseline based on historic values, wherein the historic values, e.g., the historic load data 1004. In some embodiments, the historic values of the load of the facility are load values for non-participation times of a previous time period, i.e., times at which no dispatch was received. Furthermore, in some embodiments, the baseline values are adjusted by the CMP module 1000 to account for growth in the load of the campus 102. For example, over time, the load of the campus 102 may grow and thus, based on various models of load growth and/or the historic load data 1004, the baseline can be determined by the CMP module 1000.

In step 1304, the CMP module 1000 can provide the capacity market bid 1206 to the utility. In some embodiments, the bid manager 1204 generates a bid based on and/or including the nominated capacity 1022 and provides the bid to the utility. In step 1306, the utility may provide the CMP module 1000 with a command to dispatch based on the capacity market bid 1206, i.e., based on the nominated capacity 1022. The step 1306 is shown in dashed marks in FIG. 13 because the step 1306 is a potential step, the utility may or may not dispatch the CMP module 1000.

Based on the command to dispatch of the step 1306, in step 1308, the CMP module 1000 can generate resource allocation by optimizing the objective function based on the nominated capacity 1022 and the dispatch event. Based on the allocation determined based on the optimization, the CMP module 1000 can control one or more pieces of building equipment.

In some embodiments, the CMP module 1000 can generate the allocation by optimizing the objective function:

$$J = \ldots + \sum_{i=k}^{k+h-1}(r_{e_i} + \alpha_{r,i})e_{l,i} + \sum_{i=k}^{k+h-1} q_i\beta_i s_i + \ldots$$

with the constraints:

$$s_i > 1.05 C_N - (e_{CSEB,l,i} - e_{l,i})$$

$$s_i > 0.6 C_N - (e_{CSEB,l,i} - e_{l,i})$$

In some cases, no dispatch is received from the utility, i.e., step 1306 may not occur. In such a scenario, the CMP module 1000 can be configured to implement optimization of the objective function without taking into account constraints for participation in the CMP. Furthermore, in such a situation, the CMP module 1000 can optimize the objective function with constraints other than the CMP constraints. For every time interval of the optimization horizon, the CMP module 1000 can determine that it has or has not received a dispatch. For the times where no dispatch is received, the CMP module 1000 can forego optimizing the objective function with CMP constraints (e.g., constraints for participating in a CMP program) and can instead use other constraints, e.g., battery charging constraints, constraints which define a facility etc. These other constraints may be used to optimize the objective function during dispatch times as well but may be the only constraints during non-dispatch times.

Figure 14:
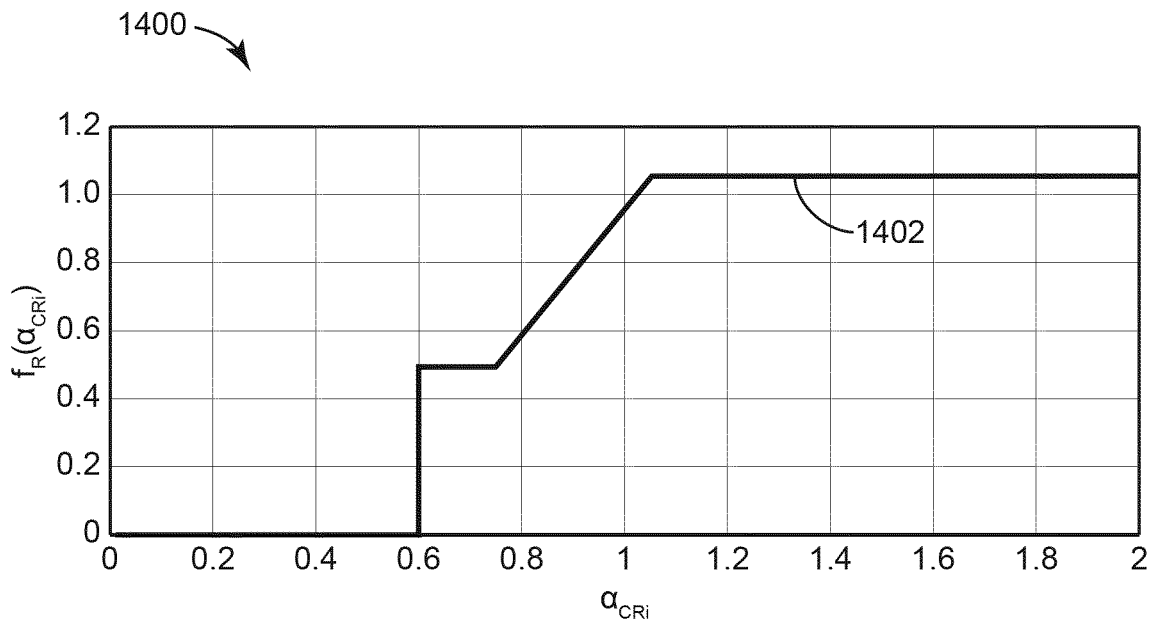
FIG. 14 is a chart illustrating an hourly revenue adjustment ratio that can be used to participate in the CMP, according to an exemplary embodiment.

Referring now to FIG. 14, a chart 1400 of the hourly revenue adjustment ratio discussed with reference to FIG. 11 is shown, according to an exemplary embodiment. The function 1402, $f_R(\alpha_{CR_i})$, the hourly revenue adjustment ratio, takes the hourly delivered capacity ratio $\alpha_{CR_i}$, as an input. The hourly revenue adjustment ratio is defined by the piece-wise function:

$$f_R(\alpha_{CR_i}) = \begin{cases} 1.05 & \alpha_{CR_i} \geq 1.05 \\ \alpha_{CR_i} & 0.75 \leq \alpha_{CR_i} < 1.05 \\ 0.5 & 0.6 \leq \alpha_{CR_i} < 0.75 \\ 0 & \text{otherwise} \end{cases}$$

Figure 15:
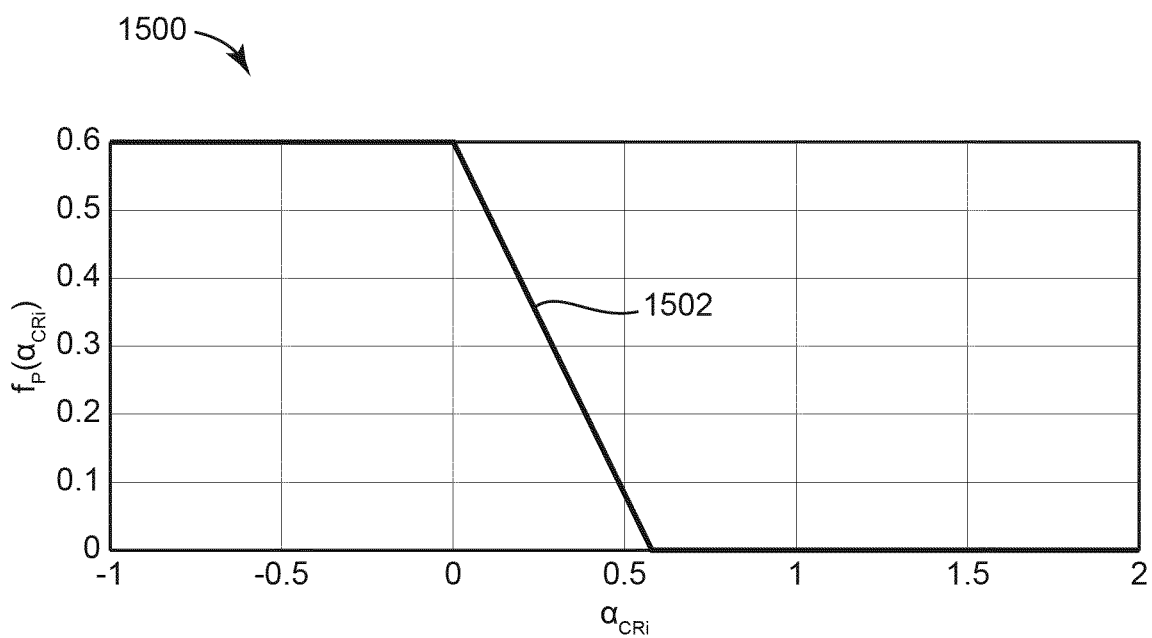
FIG. 15 is a chart illustrating an hourly penalty adjustment ratio that can be used to participating in the CMP, according to an exemplary embodiment.

Referring now to FIG. 15, a chart 1500 of the hourly penalty adjustment ratio discussed with reference to FIG. 11 is shown, according to an exemplary embodiment. The function 1502, $f_P(\alpha_{CR_i})$, the hourly penalty adjustment ratio, takes the hourly delivered capacity ratio $\alpha_{CR_i}$, as an input. The hourly penalty adjustment ratio is defined by the piece-wise function:

$$f_P(\alpha_{CR_i}) = \begin{cases} 0.6 - \alpha_{CR_i} & 0 \leq \alpha_{CR_i} < 0.6 \\ 0.6 & \alpha_{CR_i} < 0 \\ 0 & \text{otherwise} \end{cases}$$

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for generating an optimal nominated capacity value for participation in a capacity market program (CMP), the method comprising:
generating, by a processing circuit, an objective function comprising a nominated capacity term, wherein the nominated capacity term indicates the optimal nominated capacity value, wherein the optimal nominated capacity value is a curtailment value that a facility is on standby to reduce its load by in response to receiving a dispatch from a utility at an unknown time in the future;

optimizing, by the processing circuit, the objective function to determine the optimal nominated capacity value for a program operating period; and transmitting, by the processing circuit, the optimal nominated capacity value to one or more systems associated with the CMP to participate in the CMP.

2. The method of claim 1, wherein transmitting, by the processing circuit, the optimal nominated capacity value to the one or more systems associated with the CMP to participate in the CMP comprises at least one of:

transmitting, by the processing circuit, the optimal nominated capacity value to one or more building systems configured to control one or more pieces of building equipment of the facility based on the optimal nominated capacity value; or transmitting, by the processing circuit, the optimal nominated capacity value to one or more utility systems of the utility configured to supervise the CMP.

3. The method of claim 1, wherein the optimal nominated capacity value is a decision variable of the objective function, wherein the optimal nominated capacity value is multiplied by a weighting term, wherein the weighting term accounts for an optimization horizon being less than the program operating period.

4. The method of claim 1, further comprising generating, by the processing circuit, a plurality of scenarios, wherein each scenario is for at least one of one or more particular load amounts, one or more particular rate amounts, or one or more particular dispatch hours;

wherein generating, by the processing circuit, the objective function comprises generating, by the processing circuit, a plurality of cost functions, one cost function of the plurality of cost functions for each of the plurality of scenarios, wherein the objective function comprises a sum of the plurality of cost functions and a variable for the optimal nominated capacity value;

wherein optimizing, by the processing circuit, the objective function comprises optimizing, by the processing circuit, the objective function with one or more constraints, wherein the one or more constraints cause the curtailment value to be at least the optimal nominated capacity value for each scenario of the plurality of scenarios associated with at least one of the one or more particular dispatch hours;

wherein optimizing, by the processing circuit, the objective function further comprises optimizing the objective function with one or more additional constraints, wherein the one or more additional constraints cause a state of charge of a storage device of the facility to be the same at the beginning and end of each of the plurality of scenarios.

5. The method of claim 4, wherein the sum of the plurality of cost functions is a weighted sum weighted based on a first probability of receiving the dispatch during each of the plurality of scenarios, wherein the objective function is based on a second probability of each of the plurality of scenarios being an actual scenario that occurs.

6. The method of claim 1, wherein the objective function comprises an energy term that accounts for revenue generated by reducing the load of the facility by the optimal nominated capacity value or by a value greater than the optimal nominated capacity value, wherein the energy term is implemented as an electric rate adjustment to an energy rate in the objective function, wherein the value of the electric rate adjustment is a sum of a plurality of energy rates of dispatched hours.

7. The method of claim 6, wherein the energy rate is adjusted based on a compensation rate for reducing the load of the facility by the value greater than the optimal nominated capacity value.

8. The method of claim 1, wherein optimizing the objective function to determine the optimal nominated capacity value comprises optimizing the objective function with one or more constraints.

9. The method of claim 8, wherein optimizing the objective function with one or more constraints causes the optimal nominated capacity value to be a feasible value for the facility.

10. The method of claim 8, wherein the nominated capacity term of the objective function and the one or more constraints are based on a raw baseline, wherein the raw baseline indicates a typical value for the load of the facility.

11. The method of claim 10, further comprising estimating, by the processing circuit, the raw baseline based on historic values, wherein the historic values are values of the load of the facility for non-participation times of a previous time period, wherein the non-participation times are times where the processing circuit did not receive the dispatch from the utility.

12. The method of claim 11, further comprising adjusting, by the processing circuit, raw baseline values of the raw baseline to account for a growth in the load of the facility over time.

13. A system for generating an optimal nominated capacity value for participation in a capacity market program (CMP), the system comprising one or more memory devices configured to store instructions thereon, that, when executed by one or more processors, cause the one or more processors to:

generate an objective function comprising a nominated capacity term, wherein the nominated capacity term indicates the optimal nominated capacity value, wherein the optimal nominated capacity value is a curtailment value that a facility is on standby to reduce its load by in response to receiving a dispatch from a utility at an unknown time in the future;

optimize the objective function to determine the optimal nominated capacity value for a program operating period; and transmit the optimal nominated capacity value to one or more systems associated with the CMP to participate in the CMP.

14. The system of claim 13, wherein the instructions cause the one or more processors to transmit the optimal nominated capacity value to the one or more systems associated with the CMP to participate in the CMP by performing at least one of:

transmitting the optimal nominated capacity value to one or more building systems configured to control one or more pieces of building equipment of the facility based on the optimal nominated capacity value; or transmitting the optimal nominated capacity value to one or more utility systems of the utility configured to supervise the CMP.

15. The system of claim 13, wherein the optimal nominated capacity value is a decision variable of the objective function, wherein the optimal nominated capacity value is multiplied by a weighting term, wherein the weighting term accounts for an optimization horizon being less than the program operating period.

16. The system of claim 13, wherein the instructions cause the one or more processors to generate a plurality of scenarios, wherein each scenario is for at least one of one or more particular load amounts, one or more particular rate amounts, or one or more particular dispatch hours;

wherein the instructions cause the one or more processors to generate the objective function by generating a plurality of cost functions, one cost function of the plurality of cost functions for each of the plurality of scenarios, wherein the objective function comprises a sum of the plurality of cost functions and a variable for the optimal nominated capacity value;

wherein the instructions cause the one or more processors to optimize the objective function by optimizing the objective function with one or more constraints, wherein the one or more constraints cause the curtailment value to be at least the optimal nominated capacity value for each scenario of the plurality of scenarios associated with at least one of the one or more particular dispatch hours;

wherein the instructions cause the one or more processors to optimize the objective function by optimizing the objective function with one or more additional constraints, wherein the one or more additional constraints cause a state of charge of a storage device of the facility to be the same at the beginning and end of each of the plurality of scenarios.

17. The system of claim 16, wherein the sum of the plurality of cost functions is a weighted sum weighted based on a first probability of receiving the dispatch during each of the plurality of scenarios, wherein the objective function is based on a second probability of each of the plurality of scenarios being an actual scenario that occurs.

18. A building system for generating an optimal nominated capacity value for participation in a capacity market program (CMP), the building system comprising:

one or more building control systems configured to operate, based on the optimal nominated capacity value, one or more pieces of building equipment to control one or more environmental conditions of a facility; and one or more processing circuits configured to:

generate an objective function comprising a nominated capacity term, wherein the nominated capacity term indicates the optimal nominated capacity value, wherein the optimal nominated capacity value is a curtailment value that the facility is on standby to reduce its load by in response to receiving a dispatch from a utility at an unknown time in the future;

optimize the objective function to determine the optimal nominated capacity value for a program operating period; and transmit the optimal nominated capacity value to the one or more building control systems to participate in the CMP.

19. The building system of claim 18, wherein the one or more processing circuits are configured to transmit the optimal nominated capacity value to one or more utility systems of the utility configured to supervise the CMP.

20. The building system of claim 18, wherein the optimal nominated capacity value is a decision variable of the objective function, wherein the optimal nominated capacity value is multiplied by a weighting term, wherein the weighting term accounts for an optimization horizon being less than the program operating period.

* * * * *